United States Patent
Yamamoto

[11] Patent Number: 5,856,885
[45] Date of Patent: Jan. 5, 1999

[54] ZOOM LENS

[75] Inventor: Chikara Yamamoto, Saitama, Japan

[73] Assignee: Fuji Photo Optical Co., Ltd., Saitama, Japan

[21] Appl. No.: 921,332

[22] Filed: Aug. 29, 1997

[30] Foreign Application Priority Data

Aug. 29, 1996 [JP] Japan ................................ 8-248963

[51] Int. Cl.$^6$ .................................................. G02B 15/14
[52] U.S. Cl. ........................................ 359/684; 359/683
[58] Field of Search ................................ 359/676, 684, 359/683

[56] References Cited

U.S. PATENT DOCUMENTS

| 5,136,431 | 8/1992 | Terasawa et al. | 359/684 |
| 5,301,064 | 4/1994 | Sugi et al. | 359/684 |
| 5,537,255 | 7/1996 | Tochigi | 359/684 |

Primary Examiner—Scott J. Sugarman
Attorney, Agent, or Firm—Young & Thompson

[57] ABSTRACT

A zoom lens comprises, in order from the object end to the image end, a positive power first lens group, a negative power second lens group, a negative power third lens group, a positive power fourth lens group and a positive power fifth lens group. The second lens group is axially movable to vary the focal length of the zoom lens, and the fifth lens group is axially movable to correct a change in position of an image formed by the zoom lens caused during zooming and a change in position of an image formed by the zoom lens due to a change in object distance. The zoom lens satisfies at least the following condition:

$$0.8 < F_4/(F*Z1^{/2}) < 4.0$$

where F is the focal length of the overall zoom lens at the wide angle end position, $F_4$ is the focal length of the fourth lens group of the zoom lens and Z is the zoom ratio of the zoom lens.

9 Claims, 16 Drawing Sheets

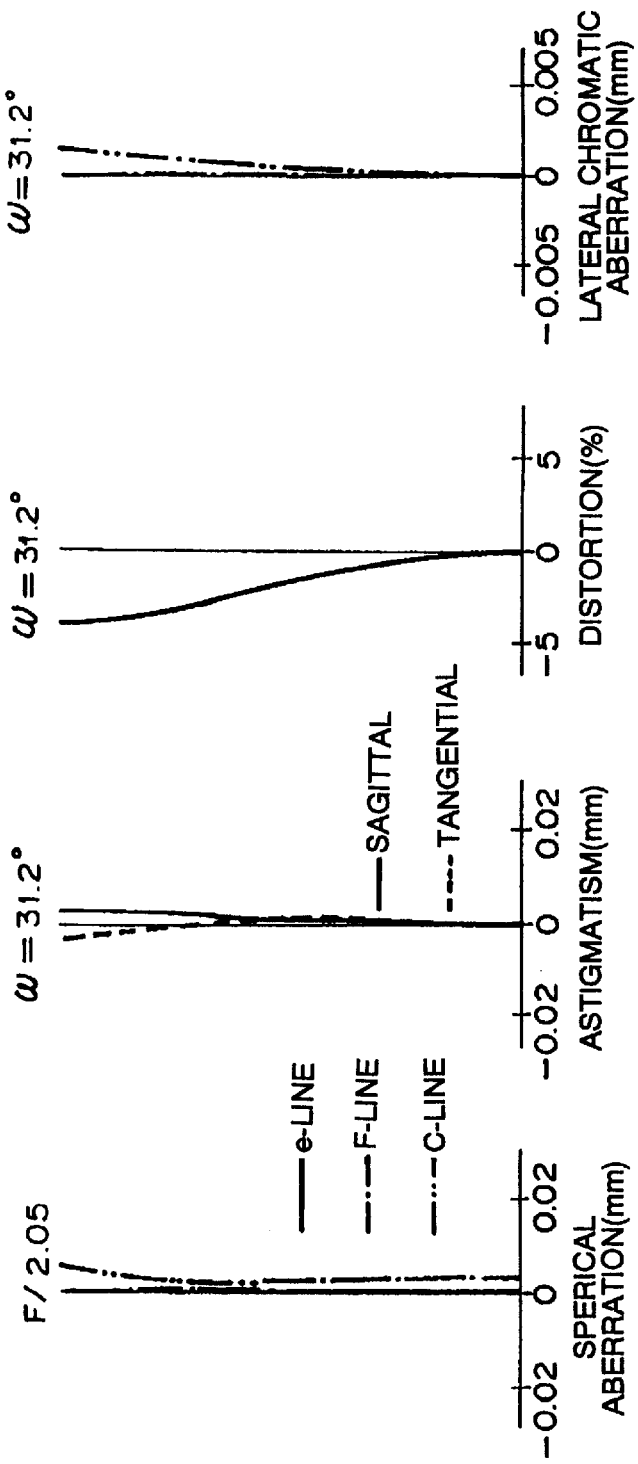

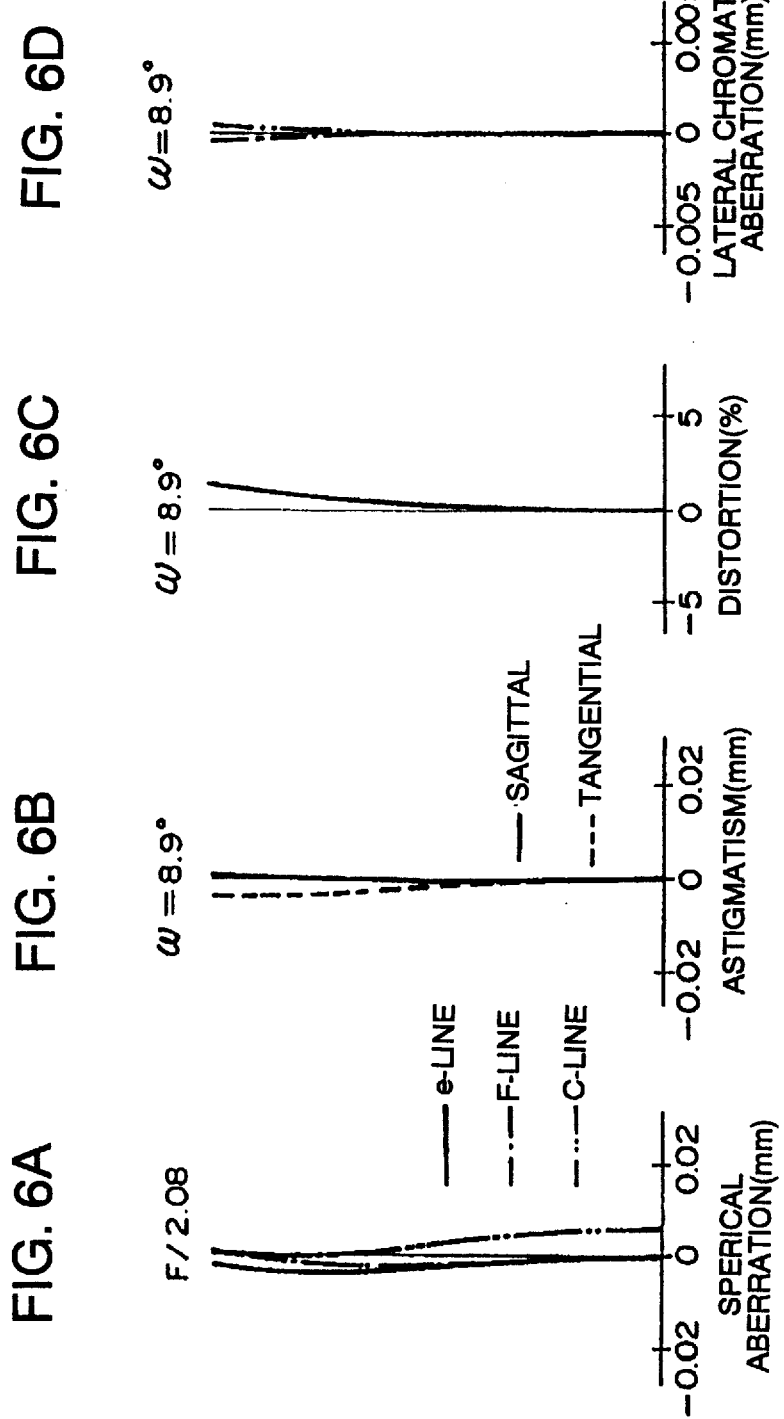

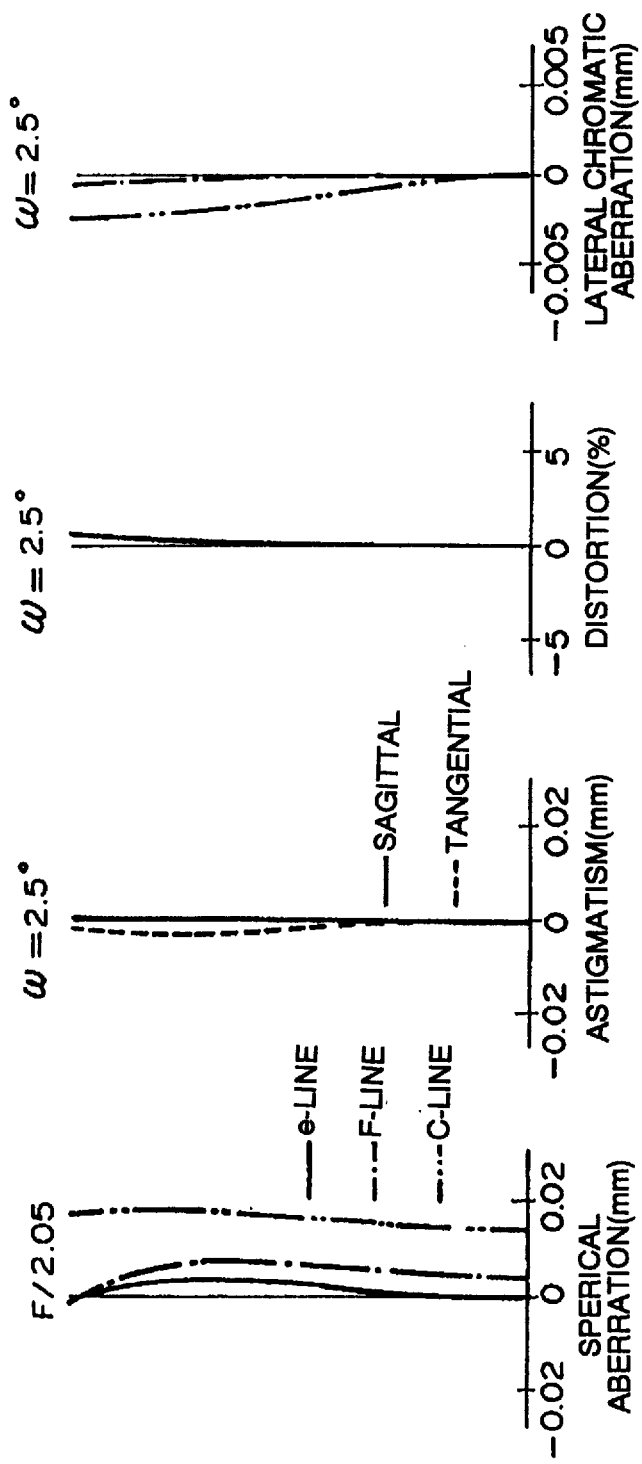

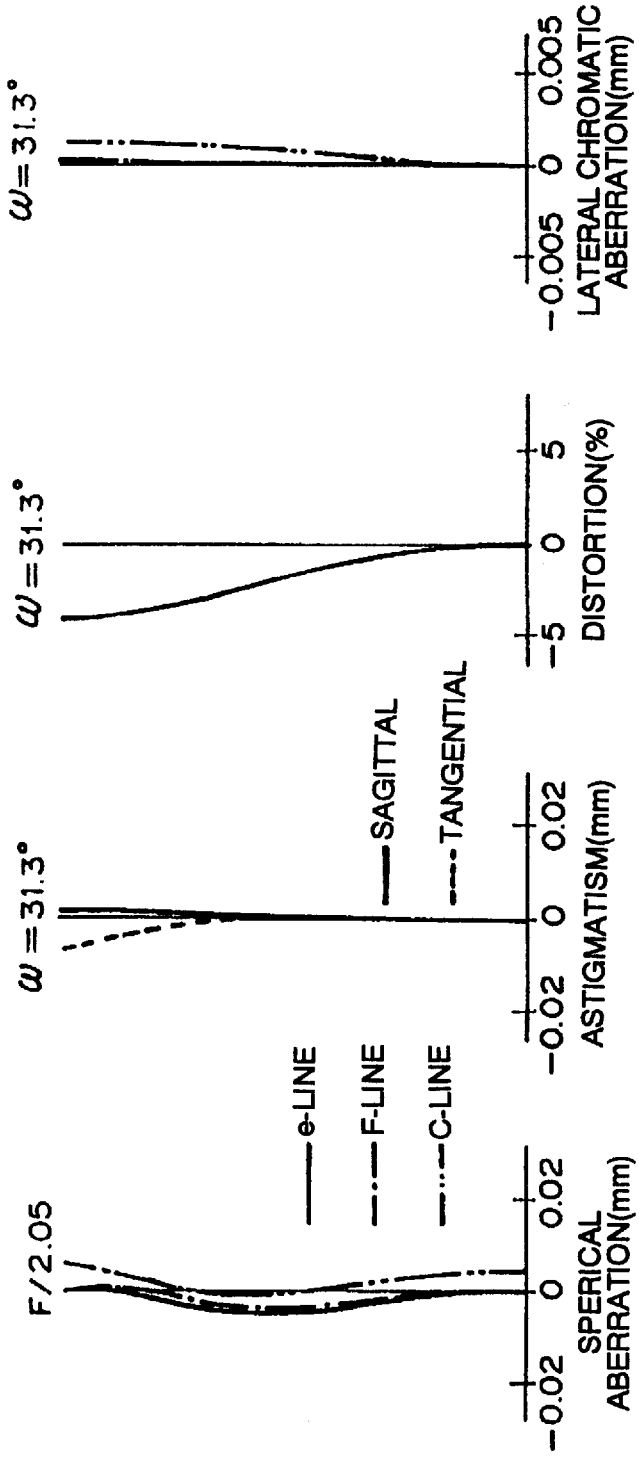

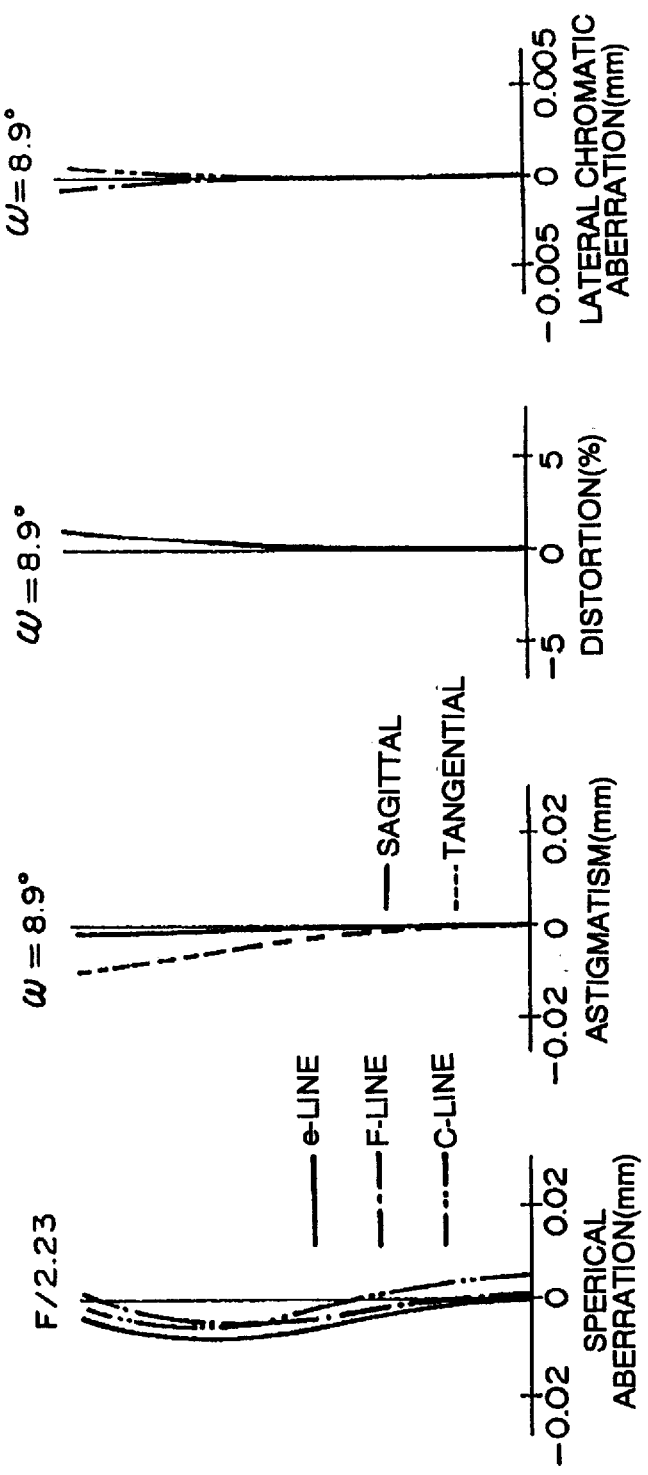

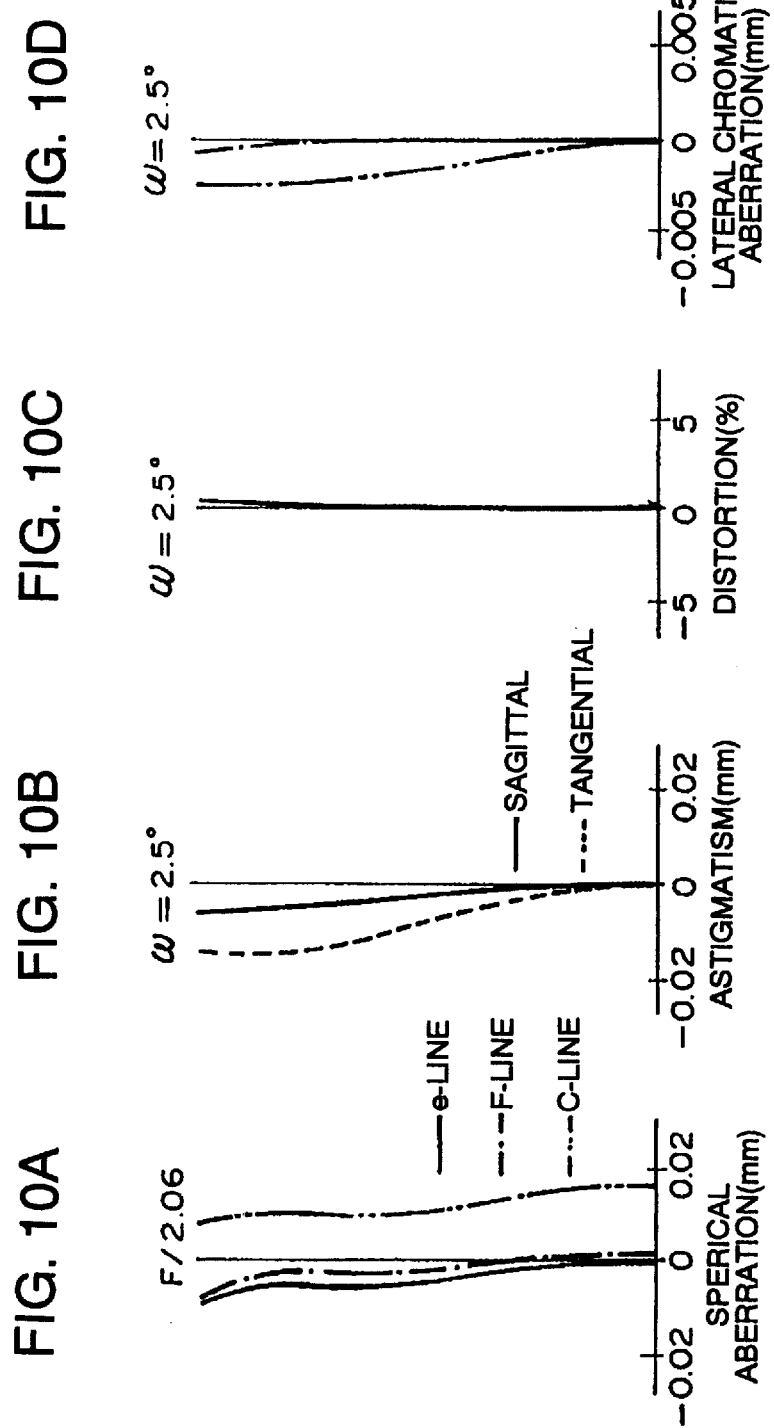

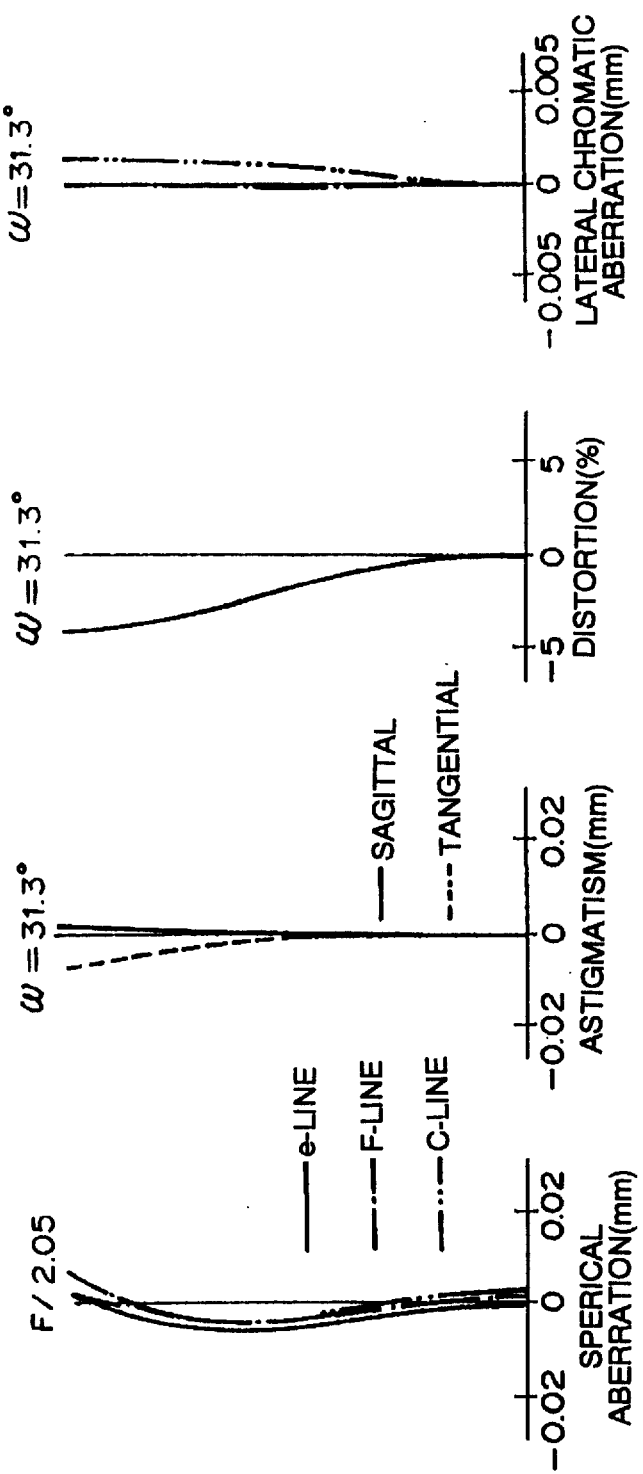

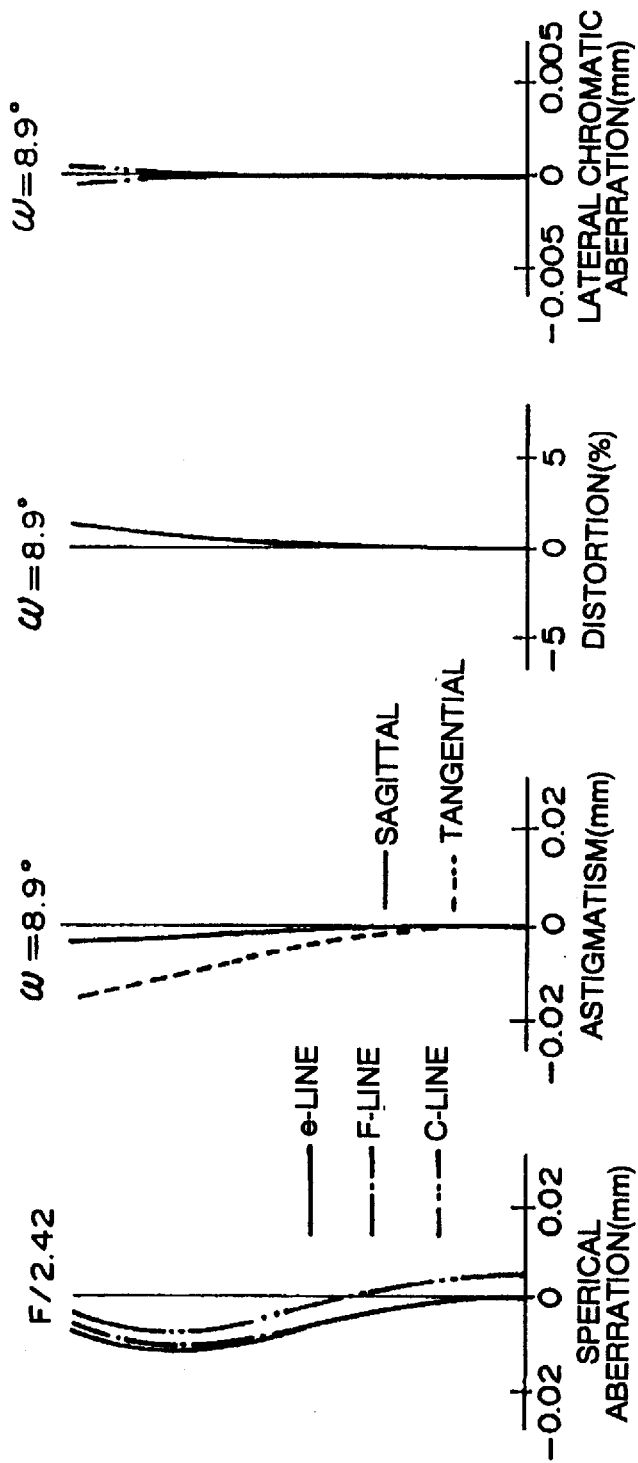

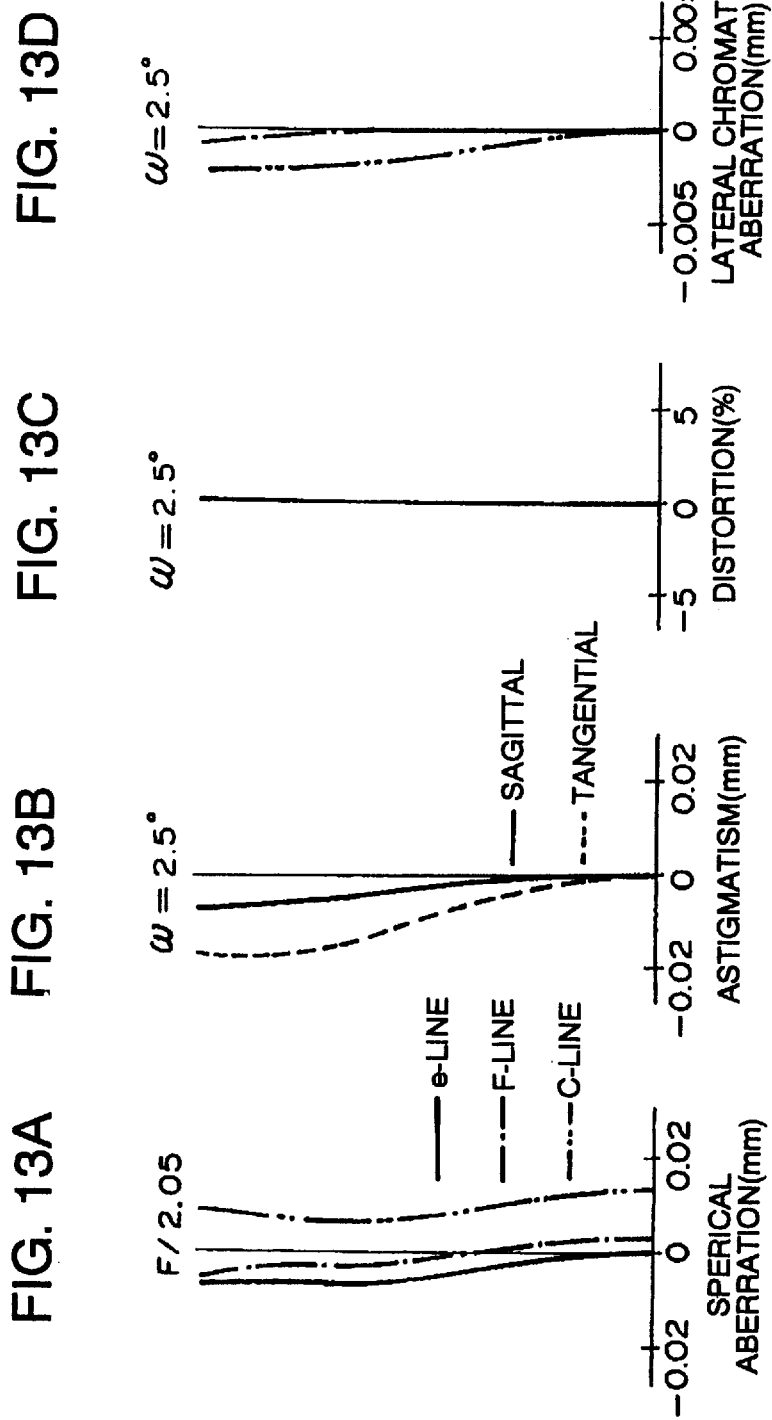

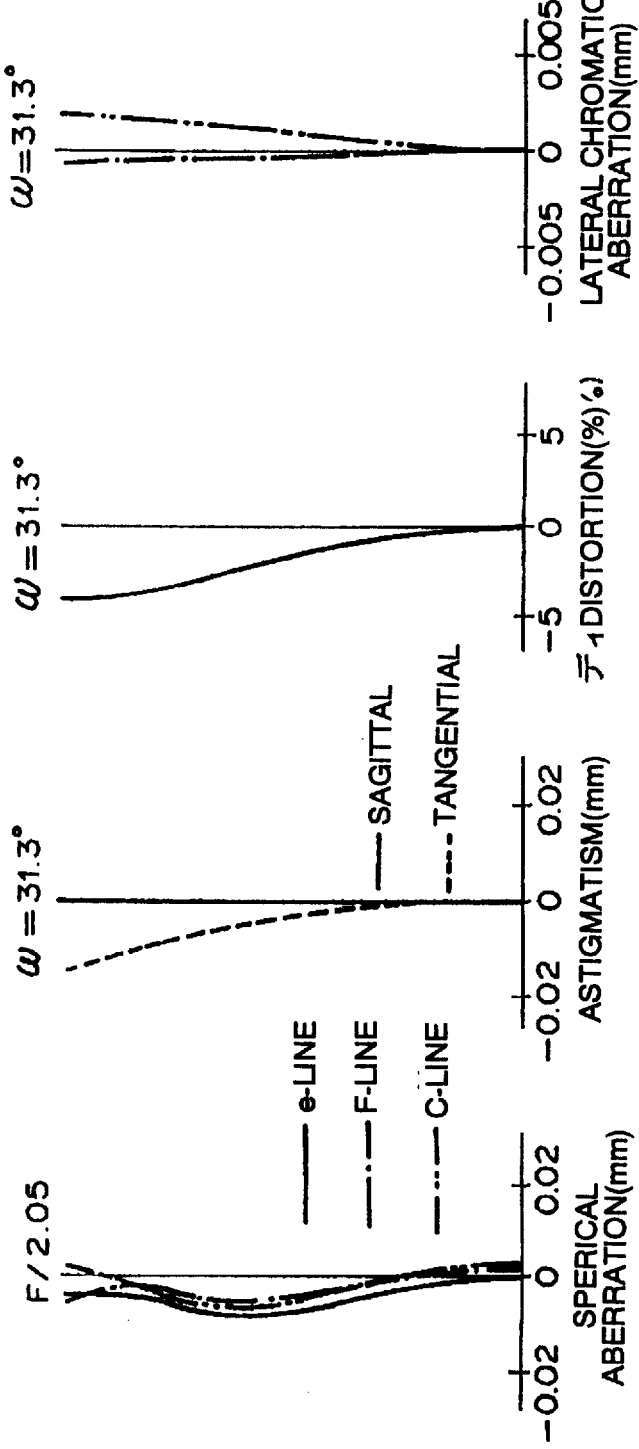

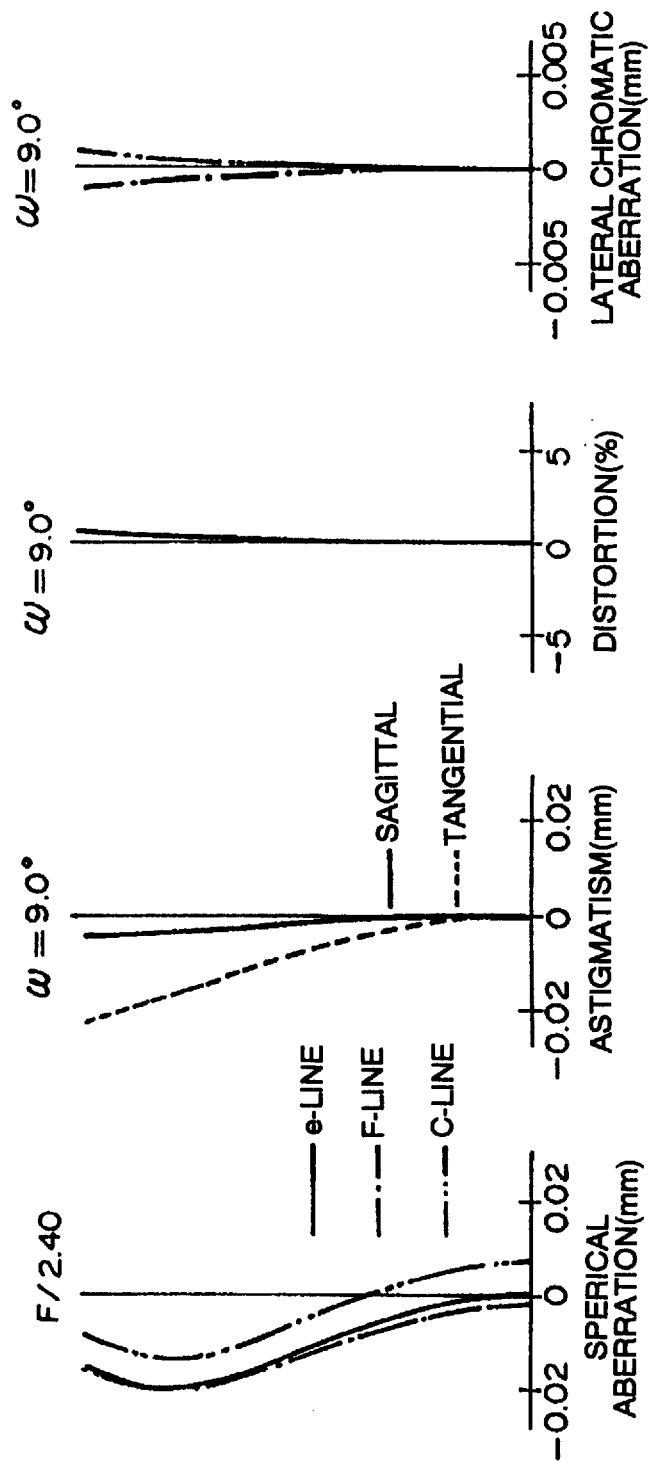

ZOOM LENS

BACKGROUND OF THE INVENTION

1. Field of the Invention

This invention relates to an imageforming optical lens for cameras having an image pickup device such as a charge coupled device (CCD) and an image pickup tube or cameras using a photographic film, and, more particularly, to a inner-focusing type of zoom lens system for a video camera and a television camera.

2. Description of Related Art

Typically, a popular inner-focusing type of zoom lens comprises four lens groups, namely, in order from the object end to the image end, a positive power first lens group, a negative power second lens group axially movable to vary the focal length of the zoom lens, a positive power third lens group, and a positive power fourth lens group axially movable to focus the zoom lens and correct a change in position of an image due to zooming. While such a inner-focusing type zoom lens is compact, which is essential for quick focusing, it causes a significant change of aberration during focusing Because the inner-focusing type zoom lens is designed with intention to be installed to single imaging plate type of video camera which generally has a short back focal distance for nonprofessional use, various constraints are imposed on structure and size in the case the inner-focusing type zoom lens is installed to a multi-imaging plate type of video camera, which are always undesirable.

SUMMARY OF THE INVENTION

It is an object of the invention to provide a inner-focusing type zoom lens which has no influence on its desirable optical performance due to focusing and zooming.

It is another object of the invention to provide a inner-focusing type zoom lens which has a back focal distance sufficiently long to be installed even to a multi-imaging plate type video camera.

The foregoing objects of the invention is accomplished by providing a inner-focusing type zoom lens comprising, in order from the object end to the image end, a positive power first lens group, a negative power second lens group, a negative power third lens group, a positive power fourth lens group and a positive power fifth lens group. The second and fourth lens groups are axially movable in predetermined relation relative to each other and relative to the first, third and fifth lens groups which are stationary to focus and vary the focal length of the zoom lens. The zoom lens satisfies the following condition:

$$0.8 < F_4/(F*Z^{1/2}) < 4.0$$

where F is the focal length of the overall zoom lens at the wide angle end position, $F_4$ is the focal length of the fourth lens group of the zoom lens, and Z is the zoom ratio of the zoom lens.

The zoom lens preferably further satisfies the following conditions:

$$-3.0 < F_2/F < -1.2$$

$$-5.8 < F_3/F < -2.5$$

$$2.5 < F_5/F < 6.0$$

where $F_2$, $F_3$ and $F_5$ are the focal length of the second, third and fifth lens groups, respectively.

The inner-focusing type zoom lens preferably includes a single component of a negative power lens element for the third lens group. Furthermore, the inner-focusing type zoom lens preferably includes a fourth lens group having an image forming magnification ratio $\beta_4 W$ defined by the following condition at the wide angle end position:

$$1.0 < \beta_4 W < 10.0$$

The zoom lens may further comprises a variable aperture stop disposed between the third and fourth lens groups.

BRIEF DESCRIPTION OF THE DRAWINGS

The above and other objects of the present invention will be understood from the following description of a specific embodiment thereof when considering in conjunction with the accompanying drawings, in which:

FIGS. 5A, 5B, 5C and 5D are graphical views showing spherical aberrations for e-line, F-line and C-line, astigmatism in sagittal and tangential planes, distortion and a lateral chromatic aberration, respectively, of the inner-focusing type zoom lens shown in FIG. 1 at the wide angle end position (WAE);

FIGS. 6A, 6B, 6C and 6D are graphical views showing spherical aberrations for e-line, F-line and C-line, astigmatism in sagittal and tangential planes, distortion and lateral chromatic aberrations, respectively, of the inner-focusing zoom lens shown in FIG. 1 at the intermediate focal length position (INT);

FIGS. 7A, 7B, 7C and 7D are graphical views showing spherical aberrations for e-line, F-line and C-line, astigmatism in sagittal and tangential planes, distortion and lateral chromatic aberrations, respectively, of the inner-focusing type zoom lens shown in FIG. 1 at the telephoto end position (TPE);

FIGS. 8A, 8B, 8C and 8D are graphical views showing spherical aberrations for e-line, F-line and C-line, astigmatism in sagittal and tangential planes, distortion and lateral chromatic aberrations, respectively, of the inner-focusing type zoom lens shown in FIG. 2 at the wide angle end position (WAE);

FIGS. 9A, 9B, 9C and 9D are graphical views showing spherical aberrations for e-line, F-line and C-line, astigmatism in sagittal and tangential planes, distortion and lateral chromatic aberrations, respectively, of the inner-focusing type zoom lens shown in FIG. 2 at the intermediate focal length position (INT);

FIGS. 10A, 10B, 10C and 10D are graphical views showing spherical aberrations for e-line, F-line and C-line, astigmatism in sagittal and tangential planes, distortion and lateral chromatic aberrations, respectively, of the inner-focusing type zoom lens shown in FIG. 2 at the telephoto end position (TPE);

FIGS. 11A, 11B, 11C and 11D are graphical views showing spherical aberrations for e-line, F-line and C-line, astigmatism in sagittal and tangential planes, distortion and lateral chromatic aberrations, respectively, of the inner-focusing type zoom lens shown in FIG. 3 at the wide angle end position (WAE);

FIGS. 12A, 12B, 12C and 12D are graphical views showing spherical aberrations for e-line, F-line and C-line, astigmatism in sagittal and tangential planes, distortion and lateral chromatic aberrations, respectively, of the inner-focusing type zoom lens shown in FIG. 3 at the intermediate focal length position (INT);

FIGS. 13A, 13B, 13C and 13D are graphical views showing spherical aberrations for e-line, F-line and C-line, astigmatism in sagittal and tangential planes, distortion and lateral chromatic aberrations, respectively, of the inner-focusing type zoom lens shown in FIG. 3 at the telephoto end position (TPE);

FIGS. 14A, 14B, 14C and 14D are graphical views showing spherical aberrations for e-line, F-line and C-line, astigmatism in sagittal and tangential planes, distortion and lateral chromatic aberrations, respectively, of the inner-focusing type zoom lens shown in FIG. 4 at the wide angle end position (WAE);

FIGS. 15A, 15B, 15C and 15D are graphical views showing spherical aberrations for e-line, F-line and C-line, astigmatism in sagittal and tangential planes, distortion and lateral chromatic aberrations, respectively, of the inner-focusing type zoom lens shown in FIG. 4 at the intermediate focal length position (INT)

DETAILED DESCRIPTION OF THE SPECIFIC EMBODIMENT

Figure 1:
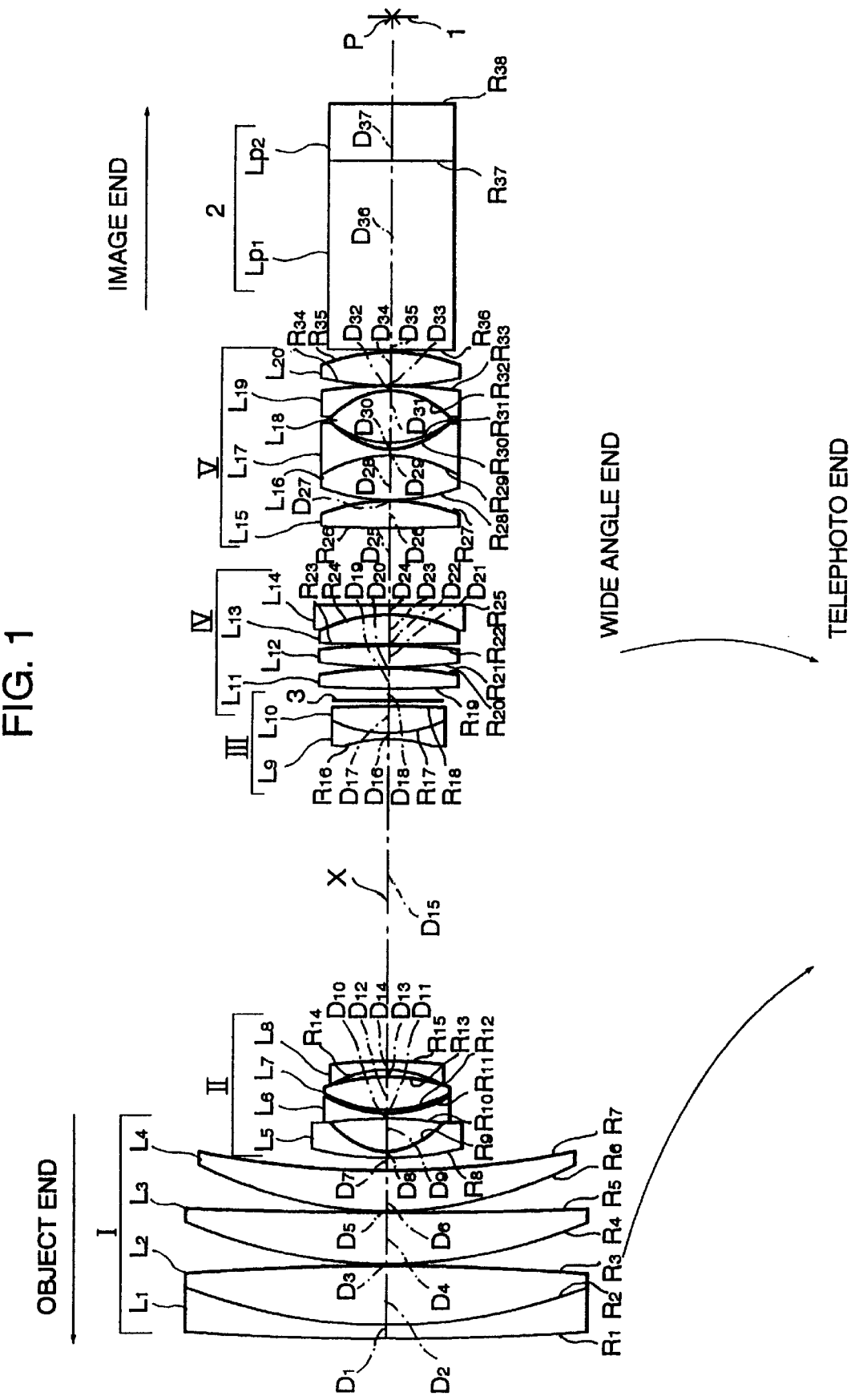
FIG. 1 is a diagrammatic side view of a basic optical structure of a zoom lens for the video projector according to an embodiment of the invention.

Referring to the drawings in detail, particularly to FIG. 1 showing a zoom lens at the wide angle end position (WAE) or the shortest focal length position embodying the invention, the zoom lens, which is of the type having five lens groups and 20 lens elements, includes, in order from the object end to the image end, a positive power first lens group I, a negative power second lens group III, a negative power third lens group III, a positive power fourth lens group IV, and a positive power fifth lens group V. The first, third and third lens groups I, III and V are stationary. The second and fourth lens groups II and IV are movable along the optical axis X for varying the focal length of the entire lens. The zoom lens is provided with a variable aperture stop 3 placed between the third and fourth lens groups III and IV. The second lens group II axially moves relative to the movable fourth lens group IV and relative to the stationary lens groups I, III and V in a direction in which the second and fourth lens groups move closer to each other to vary the focal length of the zoom lens. The fourth lens group IV axially moves relative to the second lens group II to correct a change in position of the image P formed by the zoom lens which is caused due to movement of the second lens group II for zooming, in other word to focus the zoom lens at the image plane 1. During zooming and focusing, however, the first, third and fifth lens groups I, III and V remain fixed with respect to the image plane 1 at all times.

The first lens group I comprises three components, i.e. a doublet $L_1$, $L_2$ followed by two singlets $L_3$ and $L_4$ in order from the object end. The second lens group II comprises four components, i.e. four singlets $L_5$–$L_8$ in order from the object end. The third lens group III comprises a single component of a doublet $L_9$, $L_{10}$. The fourth lens group IV comprises three components, i.e. two singlets $L_{11}$ and $L_{12}$ followed by a doublet $L_{13}$, $L_{14}$ in order from the object end. The fifth lens group V comprises four components, i.e. two singlets $L_{15}$ and $L_{20}$ and two doublets $L_{16}$, $L_{17}$ and $L_{18}$, $L_{19}$ placed between the singlets $L_{15}$ and $L_{20}$ in order from the object end.

As schematically shown in FIG. 1, the zoom lens includes an integrated optical unit 2, comprising various optical elements, such as a color separation prism, an infrared light cut filter, a low-pass filter and a cover grass for protecting a charge coupled device (CCD) as an image forming plate, placed between the fifth lens group V and the image plane 1.

Figure 2:
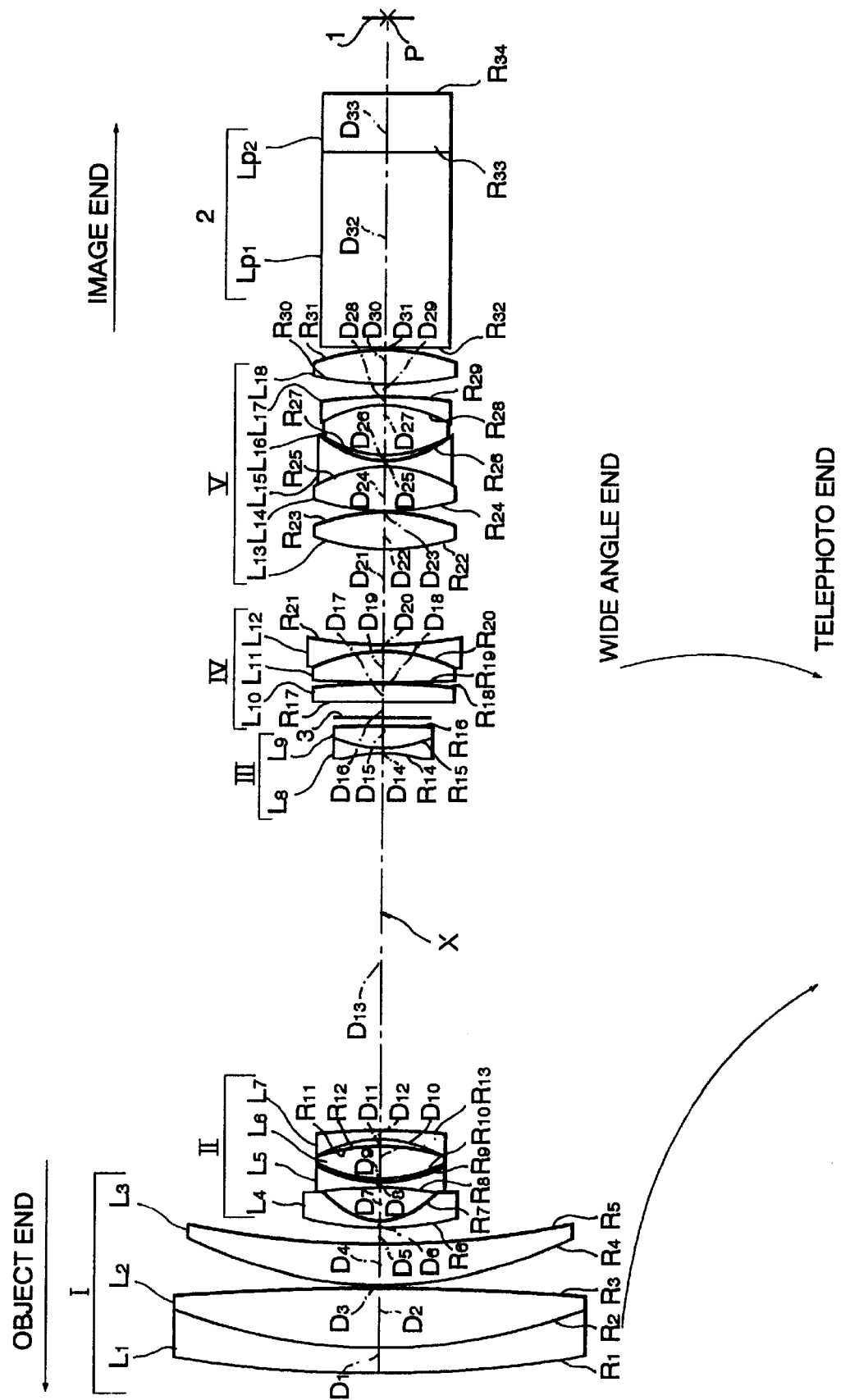
FIG. 2 is a diagrammatic side view of a basic optical structure of a zoom lens for the video projector according to another embodiment of the invention.

FIG. 2 shows a zoom lens of the type having five lens groups and 18 lens elements at the wide angle end position (WAE) or the shortest focal length position according to another embodiment of the invention. The zoom lens is of the type comprising five lens groups I–V similar to the zoom lens shown in FIG. 1 excepting that each of the first and fourth lens group I and IV includes two components comprising three lens elements. Specifically, the zoom lens includes, in order from the object end to the image end, a positive power first lens group I, a negative power second lens group II, a negative power third lens group III, a positive power fourth lens group IV, and a positive power fifth lens group V. The first, third and third lens groups I, III and V are stationary. The second and fourth lens groups II and IV are movable along the optical axis X for varying the focal length of the entire lens. The zoom lens is provided with a variable aperture stop 3 placed between the third and fourth lens groups III and IV. The second lens group II axially moves relative to the movable fourth lens group IV and relative to the stationary lens groups I, III and V in a direction in which the second and fourth lens groups move closer to each other to vary the focal length of the zoom lens. An integrated optical unit 2 similar in structure and function to that of Zoom Lens shown in FIG. 1 is placed between the fifth lens group V and the image plane 1.

The first lens group I comprises two components, i.e. a doublet $L_1$, $L_2$ followed by a singlet $L_3$ in order from the object end. The second lens group II comprises four components, i.e. four singlets $L_{4-L7}$ in order from the object end. The third lens group III comprises a single component of a doublet $L_8$, $L_9$. The fourth lens group IV comprises two components, i.e. a singlet $L_{10}$ followed by a doublet $L_{11}$, $L_{12}$ in order from the object end. The fifth lens group V comprises four components, i.e. two singlets $L_{13}$ and $L_{18}$ and two doublets $L_{14}$, $L_{15}$ and $L_{16}$, $L_{17}$ placed between the singlets $L_{13}$ and $L_{18}$ in order from the object end.

Figure 3:
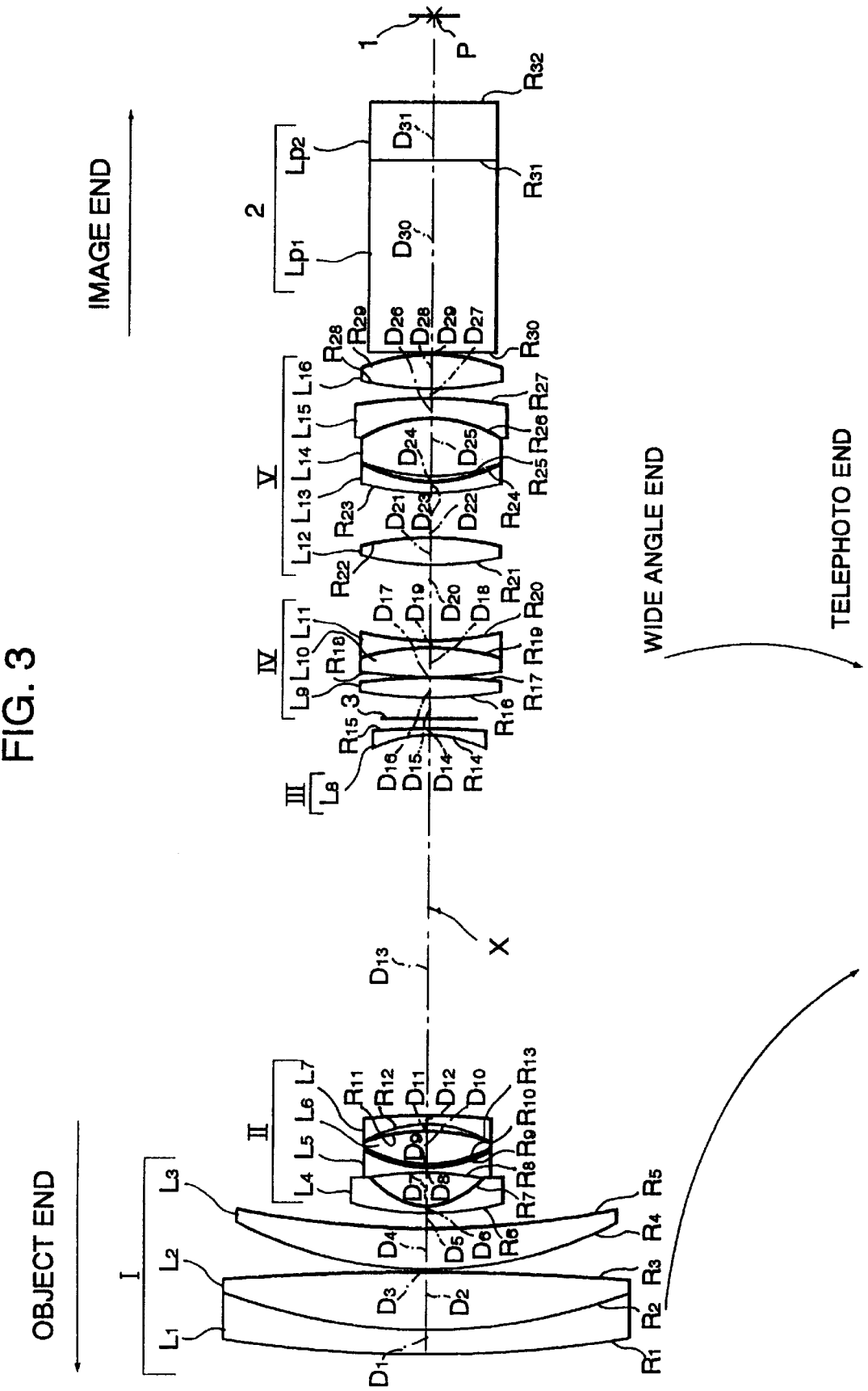
FIG. 3 is a diagrammatic side view of a basic optical structure of a zoom lens for the video projector according to another embodiment of the invention.

FIG. 3 shows a zoom lens of the type having five lens groups and 16 lens elements at the wide angle end position (WAE) or the shortest focal length position according to another embodiment of the invention. The zoom lens is of the type comprising five lens groups I–V similar to the zoom lens shown in FIG. 2 excepting that the third and fifth lens groups III and V are different in number of components from those of the zoom lens. The zoom lens includes, in order from the object end to the image end, a positive power first lens group I, a negative power second lens group II, a negative power third lens group III, a positive power fourth lens group IV, and a positive power fifth lens group V. The first, third and third lens groups I, III and V are stationary. The second and fourth lens groups II and IV are movable along the optical axis X for varying the focal length of the entire lens. The zoom lens is provided with a variable aperture stop 3 placed between the third and fourth lens groups III and IV. The second lens group II axially moves relative to the movable fourth lens group IV and relative to the stationary lens groups I, III and V in a direction in which the second and fourth lens groups move closer to each other to vary the focal length of the zoom lens. An integrated optical unit 2 similar in structure and function to that of Zoom Lens shown in FIG. 1 is placed between the fifth lens group V and the image plane 1.

The first lens group I comprises a doublet $L_1$, $L_2$ followed by a singlet $L_3$ in order from the object end. The second lens group II comprises four singlets $L_{4-L7}$ in order from the object end. The third lens group III comprises a single component of a singlet $L_8$. The fourth lens group IV comprises a singlet $L_9$ followed by a doublet $L_{10}$, $L_{11}$ in order from the object end. The fifth lens group V comprises four components, i.e. three singlets $L_{12}$, $L_{13}$ and $L_{16}$ and a doublet $L_{14}$, $L_{15}$ placed between the second and third singlets $L_{13}$ and $L_{16}$ in order from the object end.

Figure 4:
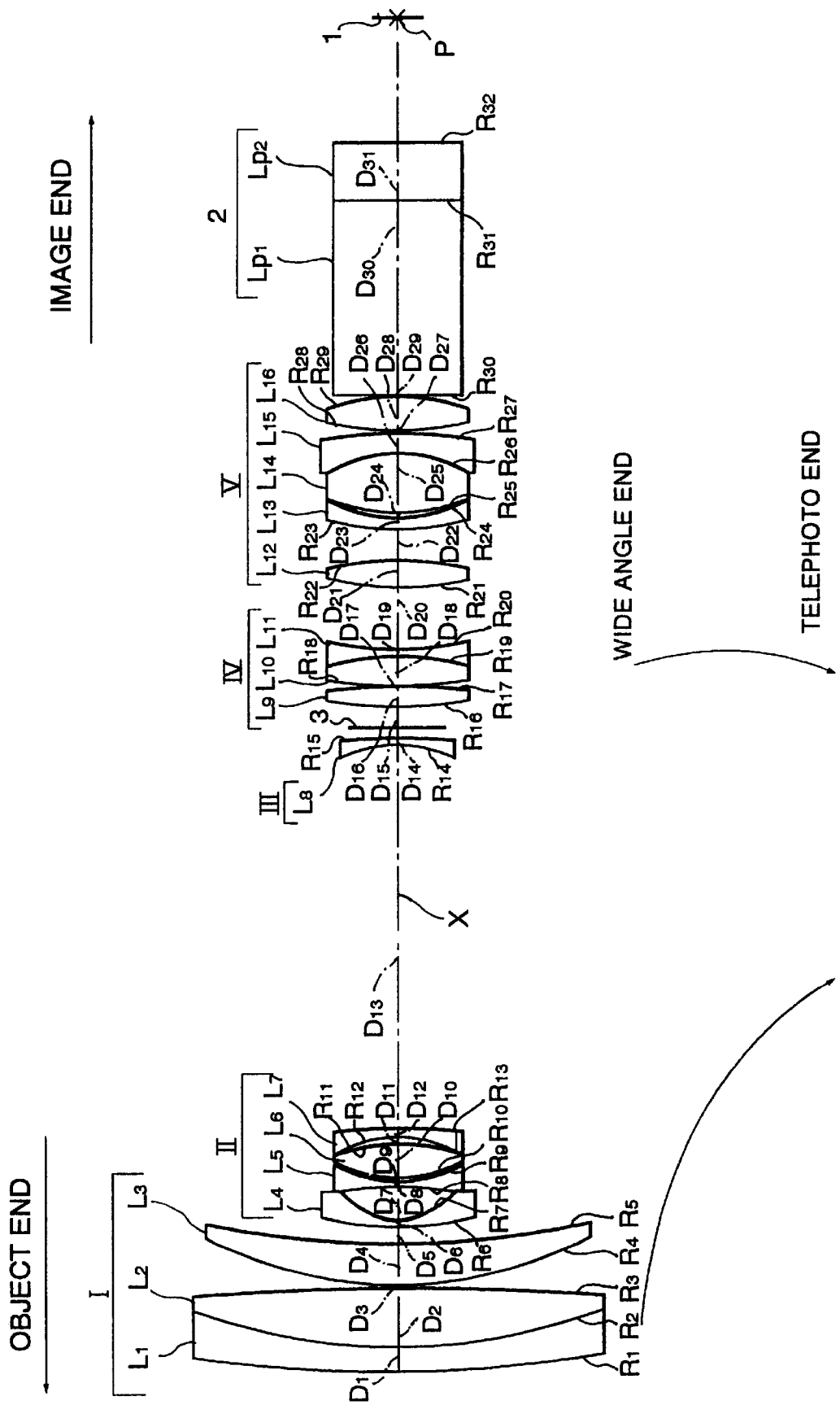
FIG. 4 is a diagrammatic side view of a basic optical structure of a zoom lens for the video projector according to another embodiment of the invention.
Figures 16A, 16B, 16C, 16D:
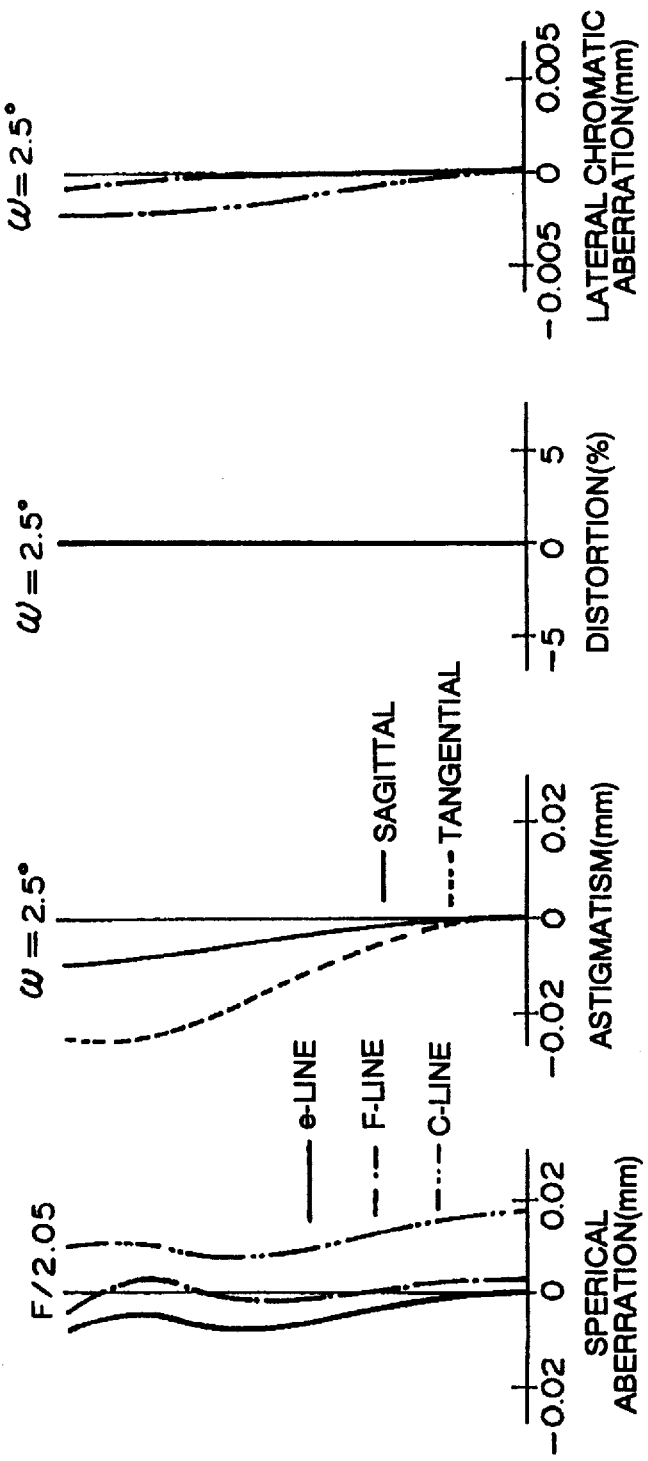
FIGS. 16A, 16B, 16C and 16D are graphical views showing spherical aberrations for e-line, F-line and C-line, astigmatism in sagittal and tangential planes, distortion and lateral chromatic aberrations, respectively, of the inner-focusing type zoom lens shown in FIG. 4 at the telephoto end position (TPE).

FIG. 4 shows a zoom lens of the type having five lens groups and 16 lens elements at the wide angle end position (WAE) or the shortest focal length position according to another embodiment of the invention. The zoom lens is similar in structure to the zoom lens shown in FIG. 3. Specifically, the zoom lens includes, in order from the object end to the image end, a positive power first lens group II, a negative power second lens group II, a negative power third lens group III, a positive power fourth lens group IV, and a positive power fifth lens group V. The first, third and third lens groups I, III and V are stationary. The second and fourth lens groups II and IV are movable along the optical axis X for varying the focal length of the entire lens. The zoom lens is provided with a variable aperture stop 3 placed between the third and fourth lens groups III and IV. The second lens group II axially moves relative to the movable fourth lens group IV and relative to the stationary lens groups I, III and V in a direction in which the second and fourth lens groups move closer to each other to vary the focal length of the zoom lens. An integrated optical unit 2 similar in structure and function to that of Zoom Lens shown in FIG. 1 is placed between the fifth lens group V and the image plane 1.

The first lens group I comprises a doublet $L_1$, $L_2$ followed by a singlet $L_3$ in order from the object end. The second lens group II comprises four singlets $L_{4-L7}$ in order from the object end. The third lens group III comprises a single component of a singlet $L_8$. The fourth lens group IV comprises a singlet $L_9$ followed by a doublet $L_{10}$, $L_{11}$ in order from the object end. The fifth lens group V comprises four components, i.e. three singlets $L_{12}$, $L_{13}$ and $L_{16}$ and a doublet $L_{14}$, $L_{15}$ placed between the second and third singlets $L_{13}$ and $L_{16}$ in order from the object end.

The zoom lens specified above in the respective embodiment is adapted and designed to satisfy the following conditions:

$$0.8 < F_4/(F*Z^{1/2}) < 4.0 \quad \text{(I)}$$

$$-3.0 < F_2/F < -1.2 \quad \text{(II)}$$

$$-5.8 < F_3/F < -2.5 \quad \text{(III)}$$

$$2.5 < F_5/F < 6.0 \quad \text{(IV)}$$

$$1.0 < \beta_4 W < 10.0 \quad \text{(IV)}$$

where F is the focal length of the zoom lens at the wide angle end position (WAE);

$F_4$ is the focal length of the fourth lens group of the zoom lens;

Z is the zoom ratio of the zoom lens;

$F_2$, $F_3$ and $F_5$ are the focal length of the second, third and fifth lens groups, respectively; and $\beta_4 W$ is the magnification ratio of the fourth lens group of the zoom lens at the wide angle end position (WAE) for a subject at infinity.

The parameters set forth are necessary for suitably balancing aberrations of the zoom lens. Satisfaction of these conditions as set forth above ensures compactness of the zoom lens with an appropriate back focal distance for incorporation of an additional optical element.

First condition (I) yields compactness of the zoom lens. If the lower limit of the ratio of $F_4/F*Z^{1/2}$ is exceeded, the fourth lens group IV has a positive refracting power too strong to prevent an increase in change of aberration during focusing and zooming, and hence is hard to balance aberrations. On the other hand, if the upper limit of the ratio of $F_4/F*Z^{1/2}$ is exceeded, the fourth group IV has a weakened positive refracting power, which yields a necessity of a long distance movement of the fourth lens group for focusing and a difficulty of maintaining the compactness of the zoom lens consequently, and, in addition, causes an increase in the height from the optical axis X of light rays directing toward the fifth lens group V which always makes the fifth lens group V hard to correct aberrations.

Second to fourth parameters provide the relationships between the focal length of the zoom lens and the second, third and fifth lens groups (II), (III) and (V), respectively. If the lower limit of the ratio of $F_2/F$ is exceeded, the second lens group II has a negative refracting power too weak to make a distance of movement for zooming short and the external diameter small. On the other hand, if the upper limit of the ratio of $F_2/F$ is exceeded, the second lens group II has a strong negative refracting power which makes it hard to correct aberrations.

If the lower limit of the ratio of $F_3/F$ is exceeded, the third lens group III has a weakened negative refracting power, resulting in a shortened back focal distance of the zoom lens. On the other hand, if the upper limit of the ratio of $F_1/F$ is exceeded, the third lens group III has a strong negative refracting power, causing an increase in the height from the optical axis X of light rays after the fourth lens group IV which always makes it hard to correct aberrations.

If the lower limit of the ratio of $F_5/F$ is exceeded, the fifth lens group V has a strong positive refracting power, resulting in a shortened back focal distance of the zoom lens. On the other hand, if the upper limit of the ratio of $F_3/F$ is exceeded, the fifth lens group V has a weakened negative refracting power with an adverse effect of making it hard to correct aberrations.

The fifth parameter provides the magnification ratio of the fourth lens group IV. If either the lower limit or the upper limit of the ratio of $\beta_4 W$ is exceeded, the fourth and fifth lens groups IV and V encounter unbalanced distribution of refracting power, resulting in a difficulty of correction of aberrations.

In the following tables, various embodiments of the invention are set forth for various equivalent focal length ranges, with the parameters of the invention. In the following prescription tables, the reference L followed by an Arabic numeral indicates the lens element progressively from the object end to the image end of the zoom lens. The reference radius numbers R are the progressive surface radii of the elements of the zoom lens. Positive surface radii are struck from the right of the surface of the element on the optical axis X, and negative surface radii are struck from the left of the surface of the element on the optical axis X. The reference distance numbers D are the progressive axial distances between adjacent surfaces, and Z1, Z2, Z3 and Z4 are variable air spacings at the wide angle end position (the shortest focal length position: WAE), the intermediate focal length position (INT) and the telephoto end position (the longest focal length position: TPE), respectively. Nd is the index of refraction of the lens elements. vd is the dispersion of the lens elements as measured by the Abbe number. The spaces Z1–Z4 are spaces between lens groups which vary with change in equivalent focal length.

A zoom lens as shown in FIG. 1 scaled to F numbers of 2.05, 2.08 and 2.05 at the wide angle end position (the shortest focal length position: WAE), the intermediate focal length position (INT) and the telephoto end position (the longest focal length position: TPE), respectively, and image angles (2ω) of 62.4°, 17.8° and 5.0° at the wide angle end position (WAE), the intermediate focal length position (INT) and the telephoto end position (TPE), respectively, is substantially described in Table I.

TABLE I

| Element | Radius of Curvature (mm) | Axial distance Between Surfaces (mm) | Nd | vd |
|---|---|---|---|---|
| $L_1$ | $R_1 = 101.094$ | $D_1 = 0.254$ | 1.80518 | 25.5 |
| $L_2$ | $R_2 = 11.290$ | $D_2 = 1.349$ | 1.51633 | 64.1 |
|  | $R_3 = -52.215$ | $D_3 = 0.019$ |  |  |
| $L_3$ | $R_4 = 11.587$ | $D_4 = 0.999$ | 1.72916 | 54.7 |
|  | $R_5 = 93.056$ | $D_5 = 0.019$ |  |  |
| $L_4$ | $R_6 = 8.141$ | $D_6 = 0.842$ | 1.72916 | 54.7 |
|  | $R_7 = 16.649$ | $D_7 = Z1$ |  |  |
| $L_5$ | $R_8 = 8.141$ | $D_8 = 0.097$ | 1.83400 | 37.2 |
|  | $R_9 = 1.640$ | $D_9 = 0.750$ |  |  |
| $L_6$ | $R_{10} = -5.553$ | $D_{10} = 0.097$ | 1.81600 | 46.6 |
|  | $R_{11} = 4.688$ | $D_{11} = 0.019$ |  |  |
| $L_7$ | $R_{12} = 2.984$ | $D_{12} = 0.723$ | 1.84666 | 23.8 |
|  | $R_{13} = -4.723$ | $D_{13} = 0.088$ |  |  |
| $L_8$ | $R_{14} = -3.723$ | $D_{14} = 0.097$ | 1.83481 | 42.7 |
|  | $R_{15} = -45.297$ | $D_{15} = Z2$ |  |  |
| $L_9$ | $R_{16} = -3.113$ | $D_{16} = 0.097$ | 1.83481 | 42.7 |
| $L_{10}$ | $R_{17} = 3.103$ | $D_{17} = 0.490$ | 1.83481 | 42.7 |
|  | $R_{18} = \infty$ | $D_{18} = Z3$ |  |  |
| $L_{11}$ | $R_{19} = -27.463$ | $D_{19} = 0.446$ | 1.58267 | 46.4 |
|  | $R_{20} = -4.451$ | $D_{20} = 0.019$ |  |  |
| $L_{12}$ | $R_{21} = 14.997$ | $D_{21} = 0.423$ | 1.80518 | 25.5 |
|  | $R_{22} = -8.570$ | $D_{22} = 0.019$ |  |  |
| $L_{13}$ | $R_{23} = 11.997$ | $D_{23} = 0.650$ | 1.48749 | 70.4 |
| $L_{14}$ | $R_{24} = -3.536$ | $D_{24} = 0.136$ | 1.84666 | 23.9 |
|  | $R_{25} = 72.198$ | $D_{25} = Z4$ |  |  |
| $L_{15}$ | $R_{26} = -83.312$ | $D_{26} = 0.535$ | 1.51823 | 58.9 |
|  | $R_{27} = -3.942$ | $D_{27} = 0.019$ |  |  |
| $L_{16}$ | $R_{28} = 4.933$ | $D_{28} = 0.966$ | 1.72825 | 28.3 |
| $L_{17}$ | $R_{29} = -2.810$ | $D_{29} = 0.146$ | 1.83481 | 42.7 |
|  | $R_{30} = 3.100$ | $D_{30} = 0.112$ |  |  |
| $L_{18}$ | $R_{31} = 4.583$ | $D_{31} = 0.968$ | 1.51823 | 58.9 |
| $L_{19}$ | $R_{32} = -2.355$ | $D_{32} = 0.136$ | 1.84666 | 23.9 |
|  | $R_{33} = -14.107$ | $D_{33} = 0.019$ |  |  |
| $L_{20}$ | $R_{34} = 7.870$ | $D_{34} = 0.838$ | 1.48749 | 70.4 |
|  | $R_{35} = -3.172$ | $D_{35} = 0.0$ |  |  |
| $L_{p1}$ | $R_{36} = \infty$ | $D_{36} = 4.076$ | 1.70154 | 41.1 |
| $L_{p2}$ | $R_{37} = \infty$ | $D_{37} = 1.310$ | 1.51633 | 64.1 |
|  | $R_{38} = \infty$ |  |  |  |

Zoom Spacing

|  | Z1 (mm) | Z2 (mm) | Z3 (mm) | Z4 (mm) |
|---|---|---|---|---|
| WAE | 0.291 | 7.166 | 0.471 | 1.707 |
| INT | 4.793 | 2.665 | 0.843 | 1.334 |
| TPE | 6.899 | 0.558 | 0.578 | 1.599 |

TABLE I-continued

The zoom lens depicted in FIG. 1 and described in the above prescription Table I has the parameters (I)–(V) as follows:

| $F_4/F*Z^{1/2}$ | $F_2/F$ | $F_3/F$ | $F_5/F$ | β4W |
|---|---|---|---|---|
| 1.35 | −1.85 | −3.78 | 4.87 | 3.90 |

As apparent from the above, the zoom lens shown in FIG. 1 satisfies all of the conditions (I)–(V).

Spherical aberrations for e-line, F-line and C-line, astigmatism in sagittal and tangential planes, distortion and lateral chromatic aberrations of the zoom lens shown in FIG. 1 at the wide angle end position (WAE), at the intermediate focal length position (INT) and at the telephoto end position (TPE) are shown in FIGS. 5A–5D, 6A–6D, and 7A–7D, respectively. As apparent from FIGS. 5A–5D, 6A–6D and 7A–7D, the zoom lens has well balanced aberrations over the range of zooming and remains the overall compactness with a sufficiently broad axial air space for the optical unit (Lp1, Lp2) 2.

A zoom lens as shown in FIG. 2 scaled to F numbers of 2.05, 2.23 and 2.06 at the wide angle end position (the shortest focal length position: WAE), the intermediate focal length position (INT) and the telephoto end position (the longest focal length position: TPE), respectively, and image angles (2ω) of 62.6°, 17.8° and 5.0° at the wide angle end position (WAE), the intermediate focal length position (INT) and the telephoto end position (TPE), respectively, is substantially described in Table II.

TABLE II

| Element | Radius of Curvature (mm) | Axial distance Between Surfaces (mm) | Nd | vd |
|---|---|---|---|---|
| $L_1$ | $R_1 = 19.401$ | $D_1 = 0.349$ | 1.84666 | 23.8 |
| $L_2$ | $R_2 = 8.582$ | $D_2 = 1.479$ | 1.72916 | 54.7 |
|  | $R_3 = -259.537$ | $D_3 = 0.019$ |  |  |
| $L_3$ | $R_4 = 7.989$ | $D_4 = 0.888$ | 1.75500 | 52.3 |
|  | $R_5 = 17.976$ | $D_5 = Z1$ |  |  |
| $L_4$ | $R_6 = 10.628$ | $D_6 = 0.146$ | 1.83400 | 37.2 |
|  | $R_7 = 1.719$ | $D_7 = 0.536$ |  |  |
| $L_5$ | $R_8 = -7.305$ | $D_8 = 0.146$ | 1.83400 | 37.2 |
|  | $R_9 = 5.059$ | $D_9 = 0.019$ |  |  |
| $L_6$ | $R_{10} = 3.109$ | $D_{10} = 0.810$ | 1.84666 | 23.8 |
|  | $R_{11} = -5.114$ | $D_{11} = 0.061$ |  |  |
| $L_7$ | $R_{12} = -4.061$ | $D_{12} = 0.146$ | 1.83481 | 42.7 |
|  | $R_{13} = 463.007$ | $D_{13} = Z2$ |  |  |
| $L_8$ | $R_{14} = -2.866$ | $D_{14} = 0.116$ | 1.81600 | 46.6 |
| $L_9$ | $R_{15} = 3.838$ | $D_{15} = 0.371$ | 1.84666 | 23.8 |
|  | $R_{16} = \infty$ | $D_{16} = Z3$ |  |  |
| $L_{10}$ | $R_{17} = 20.309$ | $D_{17} = 0.471$ | 1.78472 | 25.7 |
|  | $R_{18} = -5.006$ | $D_{18} = 0.464$ |  |  |
| $L_{11}$ | $R_{19} = 6.421$ | $D_{19} = 0.019$ | 1.51680 | 64.2 |
| $L_{12}$ | $R_{20} = -3.839$ | $D_{20} = 0.759$ | 1.80518 | 25.4 |
|  | $R_{21} = 8.347$ | $D_{21} = Z4$ |  |  |
| $L_{13}$ | $R_{22} = 6.131$ | $D_{22} = 0.851$ | 1.48749 | 70.2 |
|  | $R_{23} = -5.064$ | $D_{23} = 0.019$ |  |  |
| $L_{14}$ | $R_{24} = 4.315$ | $D_{24} = 0.990$ | 1.74077 | 27.8 |
| $L_{15}$ | $R_{25} = -4.124$ | $D_{25} = 0.165$ | 1.83481 | 42.7 |
|  | $R_{26} = 2.760$ | $D_{26} = 0.160$ |  |  |
| $L_{16}$ | $R_{27} = 4.827$ | $D_{27} = 1.159$ | 1.51823 | 59.0 |
| $L_{17}$ | $R_{28} = -2.030$ | $D_{28} = 0.165$ | 1.80518 | 25.4 |
|  | $R_{29} = -7.551$ | $D_{29} = 0.271$ |  |  |
| $L_{18}$ | $R_{30} = 8.920$ | $D_{30} = 0.892$ | 1.48749 | 70.2 |
|  | $R_{31} = -3.405$ | $D_{31} = 0.0$ |  |  |
| $L_{p1}$ | $R_{32} = \infty$ | $D_{32} = 4.076$ | 1.70154 | 41.1 |
| $L_{p2}$ | $R_{33} = \infty$ | $D_{33} = 1.310$ | 1.51633 | 64.1 |
|  | $R_{34} = \infty$ |  |  |  |

TABLE II-continued

| | Zoom Spacing | | | |
|---|---|---|---|---|
| | Z1 (mm) | Z2 (mm) | Z3 (mm) | Z4 (mm) |
| WAE | 0.291 | 7.798 | 0.471 | 1.068 |
| INT | 5.162 | 2.967 | 0.933 | 0.605 |
| TPE | 7.545 | 0.543 | 0.498 | 1.040 |

The zoom lens depicted in FIG. 2 and described in the above prescription Table II has the parameters (I)–(V) as follows:

| $F_4/F*Z^{1/2}$ | $F_2/F$ | $F_3/F$ | $F_5/F$ | $\beta 4W$ |
|---|---|---|---|---|
| 2.11 | −2.12 | −3.61 | 4.12 | 1.61 |

As apparent from the above, the zoom lens shown in FIG. 2 satisfies all of the conditions (I)–(V).

Spherical aberrations for e-line, F-line and C-line, astigmatism in sagittal and tangential planes, distortion and lateral chromatic aberrations of the zoom lens shown in FIG. 2 at the wide angle end position (the shortest focal length position: WAE), the intermediate focal length position (INT) and the telephoto end position (the longest focal is length position: TPE) are shown in FIGS. 8A–8D, 9A–9D, and 10A–10D, respectively. As apparent from FIGS. 8A–8D, 9A–9D and 10A–10D, the zoom lens has well balanced aberrations over the range of zooming and remains the overall compactness with a sufficiently broad axial air space for the optical unit (Lp1, Lp2) 2.

A zoom lens as shown in FIG. 3 scaled to F numbers of 2.05, 2.42 and 2.05 at the wide angle end position (the shortest focal length position: WAE), the intermediate focal length position (INT) and the telephoto end position (the longest focal length position: TPE), respectively, and image angles (2ω) of 62.6°, 17.8° and 5.0° at the wide angle end position (WAE), the intermediate focal length position (INT) and the telephoto end position (TPE), respectively, is substantially described in Table III.

TABLE III

| Element | Radius of Curvature (mm) | Axial distance Between Surfaces (mm) | Nd | vd |
|---|---|---|---|---|
| $L_1$ | $R_1$ = 21.320 | $D_1$ = 0.349 | 1.84666 | 23.8 |
| $L_2$ | $R_2$ = 8.945 | $D_2$ = 1.463 | 1.69680 | 55.5 |
| | $R_3$ = −121.363 | $D_3$ = 0.019 | | |
| $L_3$ | $R_4$ = 8.285 | $D_4$ = 0.887 | 1.77250 | 49.6 |
| | $R_5$ = 19.815 | $D_5$ = Z1 | | |
| $L_4$ | $R_6$ = 10.899 | $D_6$ = 0.146 | 1.83400 | 37.2 |
| | $R_7$ = 1.768 | $D_7$ = 0.854 | | |
| $L_5$ | $R_8$ = −7.538 | $D_8$ = 0.146 | 1.83400 | 37.2 |
| | $R_9$ = 5.142 | $D_9$ = 0.019 | | |
| $L_6$ | $R_{10}$ = 3.181 | $D_{10}$ = 0.836 | 1.84666 | 23.8 |
| | $R_{11}$ = −4.505 | $D_{11}$ = 0.047 | | |
| $L_7$ | $R_{12}$ = −3.894 | $D_{12}$ = 0.146 | 1.83400 | 37.2 |
| | $R_{13}$ = 102.131 | $D_{13}$ = Z2 | | |
| $L_8$ | $R_{14}$ = −3.010 | $D_{14}$ = 0.116 | 1.72916 | 54.7 |
| | $R_{15}$ = −20.893 | $D_{15}$ = Z3 | | |
| $L_9$ | $R_{16}$ = 6.102 | $D_{16}$ = 0.466 | 1.84666 | 23.8 |
| | $R_{17}$ = −8.822 | $D_{17}$ = 0.019 | | |
| $L_{10}$ | $R_{18}$ = 6.961 | $D_{18}$ = 0.655 | 1.48749 | 70.2 |
| $L_{11}$ | $R_{19}$ = −3.941 | $D_{19}$ = 0.155 | 1.80518 | 25.4 |
| | $R_{20}$ = 4.847 | $D_{20}$ = Z4 | | |
| $L_{12}$ | $R_{21}$ = 7.162 | $D_{21}$ = 0.464 | 1.84666 | 23.8 |
| | $R_{22}$ = −12.236 | $D_{22}$ = 0.152 | | |
| $L_{13}$ | $R_{23}$ = 6.803 | $D_{23}$ = 0.165 | 1.77250 | 49.6 |
| | $R_{24}$ = 2.690 | $D_{24}$ = 0.105 | | |
| $L_{14}$ | $R_{25}$ = 3.423 | $D_{25}$ = 1.354 | 1.48749 | 70.2 |
| $L_{15}$ | $R_{26}$ = −2.096 | $D_{26}$ = 0.165 | 1.75520 | 27.5 |
| | $R_{27}$ = −8.600 | $D_{27}$ = 0.218 | | |
| $L_{16}$ | $R_{28}$ = 6.711 | $D_{28}$ = 0.950 | 1.48749 | 70.2 |

TABLE III-continued

| | | | | |
|---|---|---|---|---|
| | $R_{29}$ = −3.685 | $D_{29}$ = 0.0 | | |
| $L_{p1}$ | $R_{30}$ = ∞ | $D_{30}$ = 4.076 | 1.70154 | 41.1 |
| $L_{p2}$ | $R_{31}$ = ∞ | $D_{31}$ = 1.310 | 1.51633 | 64.1 |
| | $R_{32}$ = ∞ | | | |

| | Zoom Spacing | | | |
|---|---|---|---|---|
| | Z1 (mm) | Z2 (mm) | Z3 (mm) | Z4 (mm) |
| WAE | 0.290 | 8.105 | 0.485 | 1.689 |
| INT | 5.347 | 3.048 | 1.381 | 0.792 |
| TPE | 7.852 | 0.543 | 0.485 | 1.688 |

The zoom lens depicted in FIG. 3 and described in the above prescription Table III has the parameters (I)–(V) as follows:

| $F_4/F*Z^{1/2}$ | $F_2/F$ | $F_3/F$ | $F_5/F$ | $\beta 4W$ |
|---|---|---|---|---|
| 2.79 | −2.23 | −4.82 | 4.24 | 1.33 |

As apparent from the above, the zoom lens shown in FIG. 3 satisfies all of the conditions (I)–(V).

Spherical aberrations for e-line, F-line and C-line, astigmatism in sagittal and tangential planes, distortion and lateral chromatic aberrations of the zoom lens shown in FIG. 3 at the wide angle end position, at the intermediate focal length position and at the telephoto end position are shown in FIGS. 11A–11D, 12A–12D, and 13A–13D, respectively. As apparent from FIGS. 11A–11D, 12A–12D and 13A–13D, the zoom lens has well balanced aberrations over the range of zooming and remains the overall compactness with a sufficiently broad axial air space for the optical unit (Lp1, Lp2) 2.

A zoom lens as shown in FIG. 4 scaled to F numbers of 2.05, 2.40 and 2.05 at the wide angle end position (the shortest focal length position: WAE), the intermediate focal length position (INT) and the telephoto end position (the longest focal length position: TPE), respectively, and image angles (2ω) of 62.6°, 10.0° and 5.0° at the wide angle end position (WAE), the intermediate focal length position (INT) and the telephoto end position (TPE), respectively, is substantially described in Table IV.

TABLE IV

| Element | Radius of Curvature (mm) | Axial distance Between Surfaces (mm) | Nd | vd |
|---|---|---|---|---|
| $L_1$ | $R_1$ = 15.292 | $D_1$ = 0.311 | 1.84666 | 23.8 |
| $L_2$ | $R_2$ = 6.868 | $D_2$ = 1.373 | 1.69680 | 55.5 |
| | $R_3$ = −162.261 | $D_3$ = 0.019 | | |
| $L_3$ | $R_4$ = 6.407 | $D_4$ = 0.818 | 1.75500 | 52.3 |
| | $R_5$ = 15.617 | $D_5$ = Z1 | | |
| $L_4$ | $R_6$ = 8.508 | $D_6$ = 0.146 | 1.83400 | 37.2 |
| | $R_7$ = 1.485 | $D_7$ = 0.693 | | |
| $L_5$ | $R_8$ = −7.419 | $D_8$ = 0.136 | 1.83481 | 42.7 |
| | $R_9$ = 4.090 | $D_9$ = 0.019 | | |
| $L_6$ | $R_{10}$ = 2.553 | $D_{10}$ = 0.649 | 1.84666 | 23.8 |
| | $R_{11}$ = −4.858 | $D_{11}$ = 0.075 | | |
| $L_7$ | $R_{12}$ = −3.288 | $D_{12}$ = 0.136 | 1.83481 | 42.7 |
| | $R_{13}$ = 25.313 | $D_{13}$ = Z2 | | |
| $L_8$ | $R_{14}$ = −2.368 | $D_{14}$ = 0.116 | 1.65160 | 58.5 |
| | $R_{15}$ = −18.519 | $D_{15}$ = Z3 | | |
| $L_9$ | $R_{16}$ = 4.947 | $D_{16}$ = 0.538 | 1.53172 | 48.9 |
| | $R_{17}$ = −3.792 | $D_{17}$ = 0.019 | | |
| $L_{10}$ | $R_{18}$ = 5.127 | $D_{18}$ = 0.600 | 1.51823 | 59.0 |
| $L_{11}$ | $R_{19}$ = −2.846 | $D_{19}$ = 0.136 | 1.83481 | 42.7 |
| | $R_{20}$ = 5.259 | $D_{20}$ = Z4 | | |

TABLE IV-continued

| | | | | |
|---|---|---|---|---|
| $L_{12}$ | $R_{21} = 5.948$ | $D_{21} = 0.528$ | 1.84666 | 23.8 |
| | $R_{22} = -9.024$ | $D_{22} = 0.526$ | | |
| $L_{13}$ | $R_{23} = 7.137$ | $D_{23} = 0.155$ | 1.75500 | 52.3 |
| | $R_{24} = 2.306$ | $D_{24} = 0.167$ | | |
| $L_{14}$ | $R_{25} = 2.912$ | $D_{25} = 1.131$ | 1.48749 | 70.2 |
| $L_{15}$ | $R_{26} = -1.886$ | $D_{26} = 0.165$ | 1.80518 | 25.4 |
| | $R_{27} = -7.970$ | $D_{27} = 0.019$ | | |
| $L_{18}$ | $R_{28} = 7.201$ | $D_{28} = 0.817$ | 1.48749 | 70.2 |
| | $R_{29} = -3.082$ | $D_{29} = 0.0$ | | |
| $L_{p1}$ | $R_{30} = \infty$ | $D_{30} = 4.076$ | 1.70154 | 41.1 |
| $L_{p2}$ | $R_{31} = \infty$ | $D_{31} = 1.310$ | 1.51633 | 64.1 |
| | $R_{32} = \infty$ | | | |

Zoom Spacing

| | Z1 (mm) | Z2 (mm) | Z3 (mm) | Z4 (mm) |
|---|---|---|---|---|
| WAE | 0.242 | 5.945 | 0.437 | 1.264 |
| INT | 4.013 | 2.174 | 1.202 | 0.499 |
| TPE | 5.847 | 0.339 | 0.436 | 1.264 |

The zoom lens depicted in FIG. 4 and described in the above prescription Table IV has the parameters (I)–(V) as follows:

| $F_4/F*Z^{1/2}$ | $F_2/F$ | $F_3/F$ | $F_5/F$ | β4W |
|---|---|---|---|---|
| 2.27 | -1.65 | -4.16 | 3.64 | 1.39 |

As apparent from the above, the zoom lens shown in FIG. 4 satisfies all of the conditions (I)–(V).

Spherical aberrations for e-line, F-line and C-line, astigmatism in sagittal and tangential planes, distortion and lateral chromatic aberrations of the zoom lens shown in FIG. 4 at the wide angle end position (WAE), at the intermediate focal length position (INT) and at the telephoto end position (TPE) are shown in FIGS. 14A–14D, 15A–15D, and 16A–16D, respectively. As apparent from FIGS. 14A–14D, 15A–15D and 16A–16D, the zoom lens has well balanced aberrations over the range of zooming and remains the overall compactness with a sufficiently broad axial air space for the optical unit (Lp1, Lp2) 2.

The zoom lens may include aspherical lens elements and/or refraction-distributed lenses (which are known as gradient refraction lenses and selfoc lenses) if desired.

Although the lens of the invention has been described as a camera lens in the above described embodiments, it may be utilized as a projection lens for, for example, a video projector.

The rear focusing type of zoom lens comprising five lens groups of the invention, which includes the second lens group axially movable during zooming and the fourth lens group axially movable during focusing with an effect of correcting a change in image position due to a change in subject distance, achieves excellent optical performance and has a back focal distance sufficient to incorporate necessary optical elements if it is installed to a video camera of the type having a plurality of image sensor plates.

It is to be understood that the present invention may be embodied with various changes, modifications and improvements, which may occur to those skilled in the art, without departing from the spirit and scope of the invention defined in the following claims.

What is claimed is:

1. A zoom lens comprising, in order from the object end to the image end, a positive power first lens group, a negative power second lens group, a negative power third lens group, a positive power fourth lens group and a positive power fifth lens group, said second and fourth lens groups being axially movable in predetermined relation relative to each other and relative to the first, third and fifth lens groups which are stationary to focus and vary the focal length of the zoom lens, the zoom lens satisfying the following condition:

$$0.8 < F_4/(F*Z^{1/2}) < 4.0$$

where F is the focal length of the overall zoom lens at the wide angle end position;

$F_4$ is the focal length of the fourth lens group of the zoom lens; and

Z is the zoom ratio of the zoom lens.

2. A zoom lens as defined in claim 1, and further satisfying the following conditions:

$$-3.0 < F_2/F < -1.2$$

$$-5.8 < F_3/F < -2.5$$

$$2.5 < F_5/F < 6.0$$

where $F_2$, $F_3$ and $F_5$ are the focal length of the second, third and fifth lens groups, respectively.

3. A zoom lens as defined in claim 2, wherein said third lens group comprises a single component of a concave lens element.

4. A zoom lens as defined in claim 2, wherein, when the zoom lens is in a position focused on a subject at infinity, said fourth lens group has an image forming magnification ration β4w defined by the following condition:

$$1.0 < β4W < 10.0$$

5. A zoom lens as defined in claim 2, and further comprising a variable aperture stop disposed between said third and fourth lens groups.

6. A zoom lens as defined in claim 1 scaled to F numbers of 2.05, 2.08 and 2.05 at the wide angle end position (WAE), the intermediate focal length position (INT) and the telephoto end position (the longest focal length position), respectively, and image angles (2ω) of 62.4°, 17.8° and 5.0° at the wide angle end position (WAE), the intermediate focal length position (INT) and the telephoto end position (TPE), respectively, substantially as described:

| Element | Radius of Curvature (mm) | Axial distance Between Surfaces (mm) | Nd | νd |
|---|---|---|---|---|
| $L_1$ | $R_1 = 101.094$ | $D_1 = 0.254$ | 1.80518 | 25.5 |
| $L_2$ | $R_2 = 11.290$ | $D_2 = 1.349$ | 1.51633 | 64.1 |
| | $R_3 = -52.215$ | $D_3 = 0.019$ | | |
| $L_3$ | $R_4 = 11.587$ | $D_4 = 0.999$ | 1.72916 | 54.7 |
| | $R_5 = 93.056$ | $D_5 = 0.019$ | | |
| $L_4$ | $R_6 = 8.141$ | $D_6 = 0.842$ | 1.72916 | 54.7 |
| | $R_7 = 16.649$ | $D_7 = Z1$ | | |
| $L_5$ | $R_8 = 8.141$ | $D_8 = 0.097$ | 1.83400 | 37.2 |
| | $R_9 = 1.640$ | $D_9 = 0.750$ | | |
| $L_6$ | $R_{10} = -5.553$ | $D_{10} = 0.097$ | 1.81600 | 46.6 |
| | $R_{11} = 4.688$ | $D_{11} = 0.019$ | | |
| $L_7$ | $R_{12} = 2.984$ | $D_{12} = 0.723$ | 1.84666 | 23.8 |
| | $R_{13} = -4.723$ | $D_{13} = 0.088$ | | |
| $L_8$ | $R_{14} = -3.723$ | $D_{14} = 0.097$ | 1.83481 | 42.7 |
| | $R_{15} = -45.297$ | $D_{15} = Z2$ | | |
| $L_9$ | $R_{16} = -3.113$ | $D_{16} = 0.097$ | 1.83481 | 42.7 |
| $L_{10}$ | $R_{17} = 3.103$ | $D_{17} = 0.490$ | 1.83481 | 42.7 |
| | $R_{18} = \infty$ | $D_{18} = Z3$ | | |
| $L_{11}$ | $R_{19} = -27.463$ | $D_{19} = 0.446$ | 1.58267 | 46.4 |
| | $R_{20} = -4.451$ | $D_{20} = 0.019$ | | |
| $L_{12}$ | $R_{21} = 14.997$ | $D_{21} = 0.423$ | 1.80518 | 25.5 |
| | $R_{22} = -8.570$ | $D_{22} = 0.019$ | | |

-continued

| | | | | |
|---|---|---|---|---|
| $L_{13}$ | $R_{23} = 11.997$ | $D_{23} = 0.650$ | 1.48749 | 70.4 |
| $L_{14}$ | $R_{24} = -3.536$ | $D_{24} = 0.136$ | 1.84666 | 23.9 |
| | $R_{25} = 72.198$ | $D_{25} = Z4$ | | |
| $L_{15}$ | $R_{26} = -83.312$ | $D_{26} = 0.535$ | 1.51823 | 58.9 |
| | $R_{27} = -3.942$ | $D_{27} = 0.019$ | | |
| $L_{16}$ | $R_{28} = 4.933$ | $D_{28} = 0.966$ | 1.72825 | 28.3 |
| $L_{17}$ | $R_{29} = -2.810$ | $D_{29} = 0.146$ | 1.83481 | 42.7 |
| | $R_{30} = 3.100$ | $D_{30} = 0.112$ | | |
| $L_{18}$ | $R_{31} = 4.583$ | $D_{31} = 0.968$ | 1.51823 | 58.9 |
| $L_{19}$ | $R_{32} = -2.355$ | $D_{32} = 0.136$ | 1.84666 | 23.9 |
| | $R_{33} = -14.107$ | $D_{33} = 0.019$ | | |
| $L_{20}$ | $R_{34} = 7.870$ | $D_{34} = 0.838$ | 1.48749 | 70.4 |
| | $R_{35} = -3.172$ | $D_{35} = 0.0$ | | |

Zoom Spacing

| | Z1 (mm) | Z2 (mm) | Z3 (mm) | Z4 (mm) |
|---|---|---|---|---|
| WAE | 0.291 | 7.166 | 0.471 | 1.707 |
| INT | 4.793 | 2.665 | 0.843 | 1.334 |
| TPE | 6.899 | 0.558 | 0.578 | 1.599 | where the zoom lens comprises lens elements $L_1$ to $L_4$ for the first lens group, lens elements $L_5$ to $L_8$ for the second lens group, lens elements $L_9$ and $L_{10}$ for the third lens group, lens elements $L_{11}$ to $L_{14}$ for the fourth lens group and lens elements $L_{15}$ to $L_{20}$ for the fifth lens group, said lens elements having surfaces $R_1$ to $R_{35}$ in order from the object end to the object end, reference axial distance numbers D followed by an Arabic numeral given in millimeter (mm) are the progressive axial distances between adjacent surfaces, the index of refraction is given by Nd, the dispersion vd is measured by the Abbe number, Z1 to Z4 given in millimeter (mm) are the variable air spacing at the wide angle end position (WAE), the intermediate focal length position (INT) and the telephoto end position (TPE), respectively.

7. A zoom lens as defined in claim 1 scaled to F numbers of 2.05, 2.23 and 2.06 at the wide angle end position (WAE), the intermediate focal length position (INT) and the telephoto end position (TPE), respectively, and image angles (2ω) of 62.6°, 17.8° and 5.0° at the wide angle end position (WAE), the intermediate focal length position (INT) and the telephoto end position (TPE), respectively, substantially as described:

| Element | Radius of Curvature (mm) | Axial distance Between Surfaces (mm) | Nd | vd |
|---|---|---|---|---|
| $L_1$ | $R_1 = 19.401$ | $D_1 = 0.349$ | 1.84666 | 23.8 |
| $L_2$ | $R_2 = 8.582$ | $D_2 = 1.479$ | 1.72916 | 54.7 |
| | $R_3 = -259.537$ | $D_3 = 0.019$ | | |
| $L_3$ | $R_4 = 7.989$ | $D_4 = 0.888$ | 1.75500 | 52.3 |
| | $R_5 = 17.976$ | $D_5 = Z1$ | | |
| $L_4$ | $R_6 = 10.628$ | $D_6 = 0.146$ | 1.83400 | 37.2 |
| | $R_7 = 1.719$ | $D_7 = 0.836$ | | |
| $L_5$ | $R_8 = -7.305$ | $D_8 = 0.146$ | 1.83400 | 37.2 |
| | $R_9 = 5.059$ | $D_9 = 0.019$ | | |
| $L_6$ | $R_{10} = 3.109$ | $D_{10} = 0.810$ | 1.84666 | 23.8 |
| | $R_{11} = -5.114$ | $D_{11} = 0.061$ | | |
| $L_7$ | $R_{12} = -4.061$ | $D_{12} = 0.146$ | 1.83481 | 42.7 |
| | $R_{13} = 463.007$ | $D_{13} = Z2$ | | |
| $L_8$ | $R_{14} = -2.866$ | $D_{14} = 0.116$ | 1.81600 | 46.6 |
| $L_9$ | $R_{15} = 3.838$ | $D_{15} = 0.371$ | 1.84666 | 23.8 |
| | $R_{16} = \infty$ | $D_{16} = Z3$ | | |
| $L_{10}$ | $R_{17} = 20.309$ | $D_{17} = 0.471$ | 1.78472 | 25.7 |
| | $R_{18} = -5.006$ | $D_{18} = 0.464$ | | |
| $L_{11}$ | $R_{19} = 6.421$ | $D_{19} = 0.019$ | 1.51680 | 64.2 |
| $L_{12}$ | $R_{20} = -3.839$ | $D_{20} = 0.759$ | 1.80518 | 25.4 |
| | $R_{21} = 8.347$ | $D_{21} = Z4$ | | |
| $L_{13}$ | $R_{22} = 6.131$ | $D_{22} = 0.851$ | 1.48749 | 70.2 |
| | $R_{23} = -5.064$ | $D_{23} = 0.019$ | | |
| $L_{14}$ | $R_{24} = 4.315$ | $D_{24} = 0.990$ | 1.74077 | 27.8 |
| $L_{15}$ | $R_{25} = -4.124$ | $D_{25} = 0.165$ | 1.83481 | 42.7 |
| | $R_{26} = 2.760$ | $D_{26} = 0.160$ | | |
| $L_{16}$ | $R_{27} = 4.827$ | $D_{27} = 1.159$ | 1.51823 | 59.0 |
| $L_{17}$ | $R_{28} = -2.030$ | $D_{28} = 0.165$ | 1.80518 | 25.4 |
| | $R_{29} = -7.551$ | $D_{29} = 0.271$ | | |
| $L_{18}$ | $R_{30} = 8.920$ | $D_{30} = 0.892$ | 1.48749 | 70.2 |
| | $R_{31} = -3.405$ | $D_{31} = 0.0$ | | |

Zoom Spacing

| | Z1 (mm) | Z2 (mm) | Z3 (mm) | Z4 (mm) |
|---|---|---|---|---|
| WAE | 0.291 | 7.798 | 0.471 | 1.068 |
| INT | 5.162 | 2.967 | 0.933 | 0.605 |
| TPE | 7.545 | 0.543 | 0.498 | 1.040 | where the zoom lens comprises lens elements $L_1$ to $L_3$ for the first lens group, lens elements $L_4$ to $L_7$ for the second lens group, lens elements $L_8$ and $L_9$ for the third lens group, lens elements $L_{10}$ to $L_{12}$ for the fourth lens group and lens elements $L_{13}$ to $L_{18}$ for the fifth lens group, said lens elements having surfaces $R_1$ to $R_{31}$ in order from the object end to the image end, reference axial distance numbers D followed by an Arabic numeral given in millimeter (mm) are the progressive axial distances between adjacent surfaces, the index of refraction is given by Nd, the dispersion vd is measured by the Abbe number, Z1 to Z4 given in millimeter (mm) are the variable air spacing at the wide angle end position (WAE), the intermediate focal length position (INT) and the telephoto end position (TPE), respectively.

8. A zoom lens as defined in claim 1 scaled to F numbers of 2.05, 2.42 and 2.05 at the wide angle end position (WAE), the intermediate focal length position (INT) and the telephoto end position (TPE), respectively, and image angles (2ω) of 62.6°, 17.8° and 5.0° at the wide angle end position (WAE), the intermediate focal length position (INT) and the telephoto end position (TPE), respectively, substantially as described:

| Element | Radius of Curvature (mm) | Axial distance Between Surfaces (mm) | Nd | vd |
|---|---|---|---|---|
| $L_1$ | $R_1 = 21.320$ | $D_1 = 0.349$ | 1.84666 | 23.8 |
| $L_2$ | $R_2 = 8.945$ | $D_2 = 1.463$ | 1.69680 | 55.5 |
| | $R_3 = -121.363$ | $D_3 = 0.019$ | | |
| $L_3$ | $R_4 = 8.285$ | $D_4 = 0.887$ | 1.77250 | 49.6 |
| | $R_5 = 19.815$ | $D_5 = Z1$ | | |
| $L_4$ | $R_6 = 10.899$ | $D_6 = 0.146$ | 1.83400 | 37.2 |
| | $R_7 = 1.768$ | $D_7 = 0.854$ | | |
| $L_5$ | $R_8 = -7.538$ | $D_8 = 0.146$ | 1.83400 | 37.2 |
| | $R_9 = 5.142$ | $D_9 = 0.019$ | | |
| $L_6$ | $R_{10} = 3.181$ | $D_{10} = 0.836$ | 1.84666 | 23.8 |
| | $R_{11} = -4.505$ | $D_{11} = 0.047$ | | |
| $L_7$ | $R_{12} = -3.894$ | $D_{12} = 0.146$ | 1.83400 | 37.2 |
| | $R_{13} = 102.131$ | $D_{13} = Z2$ | | |
| $L_8$ | $R_{14} = -3.010$ | $D_{14} = 0.116$ | 1.72916 | 54.7 |
| | $R_{15} = -20.893$ | $D_{15} = Z3$ | | |
| $L_9$ | $R_{16} = 6.102$ | $D_{16} = 0.466$ | 1.84666 | 23.8 |
| | $R_{17} = -8.822$ | $D_{17} = 0.019$ | | |
| $L_{10}$ | $R_{18} = 6.961$ | $D_{18} = 0.655$ | 1.48749 | 70.2 |
| $L_{11}$ | $R_{19} = -3.941$ | $D_{19} = 0.155$ | 1.80518 | 25.4 |
| | $R_{20} = 4.847$ | $D_{20} = Z4$ | | |
| $L_{12}$ | $R_{21} = 7.162$ | $D_{21} = 0.464$ | 1.84666 | 23.8 |
| | $R_{22} = -12.236$ | $D_{22} = 0.152$ | | |
| $L_{13}$ | $R_{23} = 6.803$ | $D_{23} = 0.165$ | 1.77250 | 49.6 |
| | $R_{24} = 2.690$ | $D_{24} = 0.105$ | | |
| $L_{14}$ | $R_{25} = 3.423$ | $D_{25} = 1.354$ | 1.48749 | 70.2 |
| $L_{15}$ | $R_{26} = -2.096$ | $D_{26} = 0.165$ | 1.75520 | 27.5 |
| | $R_{27} = -8.600$ | $D_{27} = 0.218$ | | |
| $L_{16}$ | $R_{28} = 6.711$ | $D_{28} = 0.950$ | 1.48749 | 70.2 |
| | $R_{29} = -3.685$ | $D_{29} = 0.0$ | | |

-continued

| | Zoom Spacing | | | |
|---|---|---|---|---|
| | Z1 (mm) | Z2 (mm) | Z3 (mm) | Z4 (mm) |
| WAE | 0.290 | 8.105 | 0.485 | 1.689 |
| INT | 5.347 | 3.048 | 1.381 | 0.792 |
| TPE | 7.852 | 0.543 | 0.485 | 1.688 | where the zoom lens comprises lens elements $L_1$ to $L_3$ for the first lens group, lens elements $L_4$ to $L_7$ for the second lens group, a lens element $L_8$ for the third lens group, lens elements $L_9$ to $L_{11}$ for the fourth lens group and lens elements $L_{12}$ to $L_{16}$ for the fifth lens group, said lens elements having surfaces $R_1$ to $R_{29}$ in order from the object end to the image end, reference axial distance numbers D followed by an Arabic numeral given in millimeter (mm) are the progressive axial distances between adjacent surfaces, the index of refraction is given by Nd, the dispersion vd is measured by the Abbe number, Z1 to Z4 given in millimeter (mm) are the variable air spacing at the wide angle end position (WAE), the intermediate focal length position (INT) and the telephoto end position (TPE), respectively.

9. A zoom lens as defined in claim 1 scaled to F numbers of 2.05, 2.40 and 2.05 at the wide angle end position (WAE), the intermediate focal length position (INT) and the telephoto end position (TPE), respectively, and image angles (2ω) of 62.6°, 10.0° and 5.0° at the wide angle end position (WAE), the intermediate focal length position (INT) and the telephoto end position (TPE), respectively, substantially as described:

| Element | Radius of Curvature (mm) | Axial distance Between Surfaces (mm) | Nd | vd |
|---|---|---|---|---|
| $L_1$ | $R_1 = 15.292$ | $D_1 = 0.311$ | 1.84666 | 23.8 |
| $L_2$ | $R_2 = 6.868$ | $D_2 = 1.373$ | 1.69680 | 55.5 |
| | $R_3 = -162.261$ | $D_3 = 0.019$ | | |
| $L_3$ | $R_4 = 6.407$ | $D_4 = 0.818$ | 1.75500 | 52.3 |
| | $R_5 = 15.617$ | $D_5 = Z1$ | | |
| $L_4$ | $R_6 = 8.508$ | $D_6 = 0.146$ | 1.83400 | 37.2 |
| | $R_7 = 1.485$ | $D_7 = 0.693$ | | |
| $L_5$ | $R_8 = -7.419$ | $D_8 = 0.136$ | 1.83481 | 42.7 |
| $L_6$ | $R_9 = 4.090$ | $D_9 = 0.019$ | | |
| | $R_{10} = 2.553$ | $D_{10} = 0.649$ | 1.84666 | 23.8 |
| | $R_{11} = -4.858$ | $D_{11} = 0.075$ | | |
| $L_7$ | $R_{12} = -3.288$ | $D_{12} = 0.136$ | 1.83481 | 42.7 |
| | $R_{13} = 25.313$ | $D_{13} = Z2$ | | |
| $L_8$ | $R_{14} = -2.368$ | $D_{14} = 0.116$ | 1.65160 | 58.5 |
| | $R_{15} = -18.519$ | $D_{15} = Z3$ | | |
| $L_9$ | $R_{16} = 4.947$ | $D_{16} = 0.535$ | 1.53172 | 48.9 |
| | $R_{17} = -3.792$ | $D_{17} = 0.019$ | | |
| $L_{10}$ | $R_{18} = 5.127$ | $D_{18} = 0.600$ | 1.51823 | 59.0 |
| $L_{11}$ | $R_{19} = -2.846$ | $D_{19} = 0.136$ | 1.83481 | 42.7 |
| | $R_{20} = 5.259$ | $D_{20} = Z4$ | | |
| $L_{12}$ | $R_{21} = 5.948$ | $D_{21} = 0.528$ | 1.84666 | 23.8 |
| | $R_{22} = -9.024$ | $D_{22} = 0.526$ | | |
| $L_{13}$ | $R_{23} = 7.137$ | $D_{23} = 0.155$ | 1.75500 | 52.3 |
| | $R_{24} = 2.306$ | $D_{24} = 0.167$ | | |
| $L_{14}$ | $R_{25} = 2912$ | $D_{25} = 1.131$ | 1.48749 | 70.2 |
| $L_{15}$ | $R_{26} = -1.886$ | $D_{26} = 0.165$ | 1.80518 | 25.4 |
| | $R_{27} = -7.970$ | $D_{27} = 0.019$ | | |
| $L_{16}$ | $R_{28} = 7.201$ | $D_{28} = 0.817$ | 1.48749 | 70.2 |
| | $R_{29} = -3.082$ | $D_{29} = 0.0$ | | |

| | Zoom Spacing | | | |
|---|---|---|---|---|
| | Z1 (mm) | Z2 (mm) | Z3 (mm) | Z4 (mm) |
| WAE | 0.242 | 5.945 | 0.437 | 1.264 |
| INT | 4.013 | 2.174 | 1.202 | 0.499 |
| TPE | 5.847 | 0.339 | 0.436 | 1.264 | where the zoom lens comprises lens elements $L_1$ to $L_3$ for the first lens group, lens elements $L_4$ to $L_7$ for the second lens group, a lens element $L_8$ for the third lens group, lens elements $L_9$ to $L_{11}$ for the fourth lens group and lens elements $L_{12}$ to $L_{16}$ for the fifth lens group, said lens elements having surfaces $R_1$ to $R_{29}$ in order from the object end to the image end, reference axial distance numbers D followed by an Arabic numeral given in millimeter (mm) are the progressive axial distances between adjacent surfaces, the index of refraction is given by Nd, the dispersion vd is measured by the Abbe number, Z1 to Z4 given in millimeter (mm) are the variable air spacing at the wide angle end position (WAE), the intermediate focal length position (INT) and the telephoto end position (TPE), respectively.

* * * * *